US011755967B2

United States Patent
R et al.

(10) Patent No.: US 11,755,967 B2
(45) Date of Patent: Sep. 12, 2023

(54) TIME-BASED DECOMPOSITION FOR SUPPLY CHAIN OPTIMIZATION PROBLEM

(71) Applicant: Blue Yonder Group, Inc., Scottsdale, AZ (US)

(72) Inventors: Devanand R, Bangalore (IN); Narayan Nandeda, Ujjain (IN); Tushar Shekhar, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 18/105,717

(22) Filed: Feb. 3, 2023

(65) Prior Publication Data

US 2023/0186186 A1 Jun. 15, 2023

Related U.S. Application Data

(63) Continuation of application No. 17/739,861, filed on May 9, 2022, now Pat. No. 11,586,995, which is a continuation of application No. 16/722,866, filed on Dec. 20, 2019, now Pat. No. 11,328,229.

(60) Provisional application No. 62/895,870, filed on Sep. 4, 2019, provisional application No. 62/856,283, filed on Jun. 3, 2019.

(51) Int. Cl.
*G06Q 10/04* (2023.01)
*G06Q 10/0631* (2023.01)

(52) U.S. Cl.
CPC ....... *G06Q 10/04* (2013.01); *G06Q 10/06315* (2013.01)

(58) Field of Classification Search
CPC .......................................... G06Q 10/00–50/00
USPC .................................................. 705/7.11–7.42
See application file for complete search history.

(56) References Cited

U.S. PATENT DOCUMENTS

| | | | | |
|---|---|---|---|---|
| 5,930,762 A * | 7/1999 | Masch | ................... | G06Q 10/06 705/7.36 |
| 6,701,201 B2 * | 3/2004 | Hegde | ................ | G06Q 10/0875 700/106 |
| 7,200,454 B2 * | 4/2007 | Coppola | ................ | G06Q 10/06 700/107 |
| 7,606,743 B2 * | 10/2009 | Orzell | ................. | G06Q 10/087 705/28 |
| 7,966,208 B2 * | 6/2011 | Denton | ................. | G06Q 10/06 705/7.12 |

(Continued)

*Primary Examiner* — Alan S Miller
(74) *Attorney, Agent, or Firm* — Spencer Fane LLP; Steven J. Laureanti

(57) ABSTRACT

A system and method are disclosed for solving a supply chain planning problem modeled as a linear programming (LP) problem. Embodiments further include receiving a multi-period matrix formulation of a least a portion of an LP supply chain master planning problem representing a supply chain planning problem for a supply chain network and having a planning horizon divided into time buckets separated by time-bucket boundaries, mapping constraints of the LP supply chain master planning problem and variables of the LP supply chain master planning problem to the time buckets, calculating a quantity of cross-over variables for the constraints and the time buckets, selecting one or more decomposition boundaries from the time-bucket boundaries, and formulating at least two time-based decomposed subproblems by decomposing the LP supply chain master planning problem at the one or more decomposition boundaries.

20 Claims, 14 Drawing Sheets

(56) References Cited

U.S. PATENT DOCUMENTS

| | | | | |
|---|---|---|---|---|
| 8,428,987 B2* | 4/2013 | Najmi | ............... | G06Q 30/0202 |
| | | | | 705/7.11 |
| 8,429,035 B1* | 4/2013 | Kamath | ............... | G06Q 10/06 |
| | | | | 705/28 |
| 8,615,416 B2* | 12/2013 | Milne | ............. | G06Q 10/06375 |
| | | | | 705/7.29 |
| 10,235,647 B2* | 3/2019 | Moorkanat | ...... | G06Q 10/06315 |
| 11,328,229 B1* | 5/2022 | R | ..................... | G06Q 10/06315 |
| 2001/0032029 A1* | 10/2001 | Kauffman | ........ | G06Q 10/06316 |
| | | | | 700/106 |
| 2003/0065415 A1* | 4/2003 | Hegde | ............... | G06Q 10/0875 |
| | | | | 700/100 |
| 2008/0221960 A1* | 9/2008 | Moorkanat | ............ | G06Q 10/04 |
| | | | | 705/7.25 |
| 2008/0243570 A1* | 10/2008 | Moorkanat | ............ | G06Q 10/06 |
| | | | | 705/7.12 |
| 2015/0254589 A1* | 9/2015 | Saxena | ............ | G06Q 10/06315 |
| | | | | 705/7.25 |
| 2019/0213517 A1 | 7/2019 | Moorkanat et al. | | |

* cited by examiner

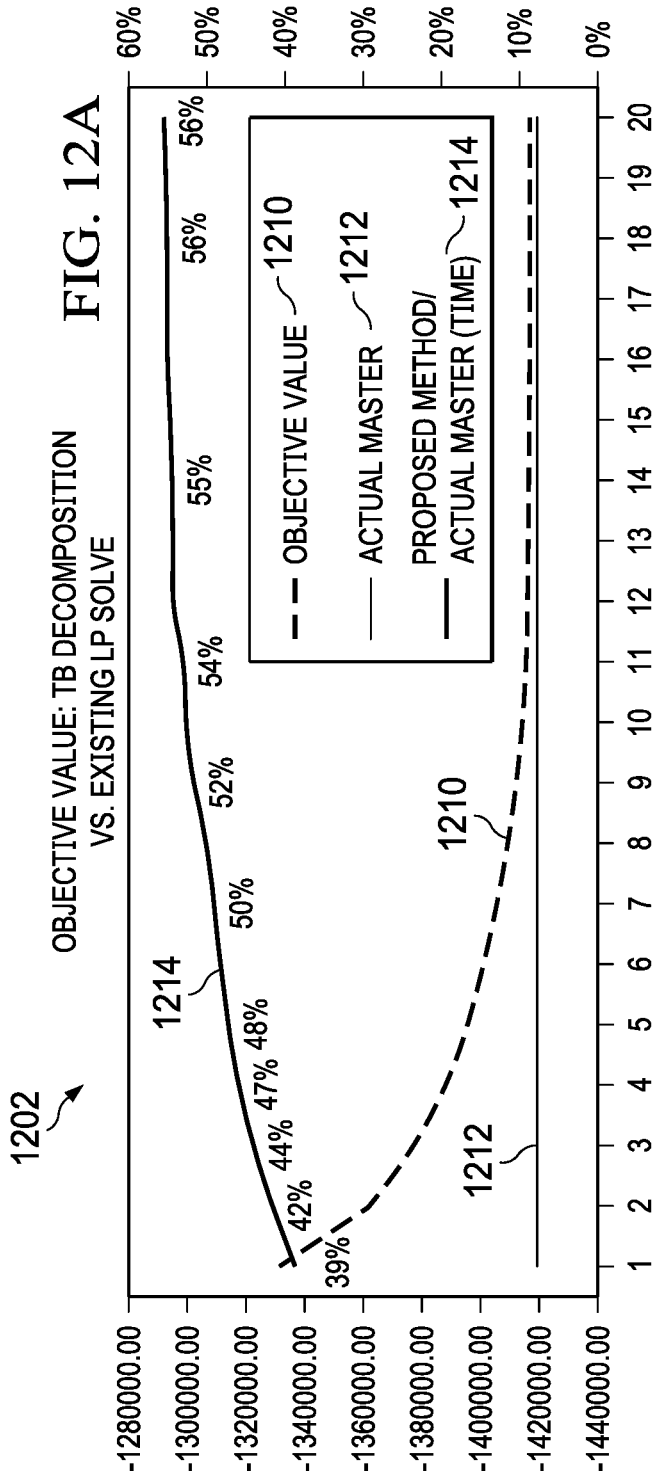

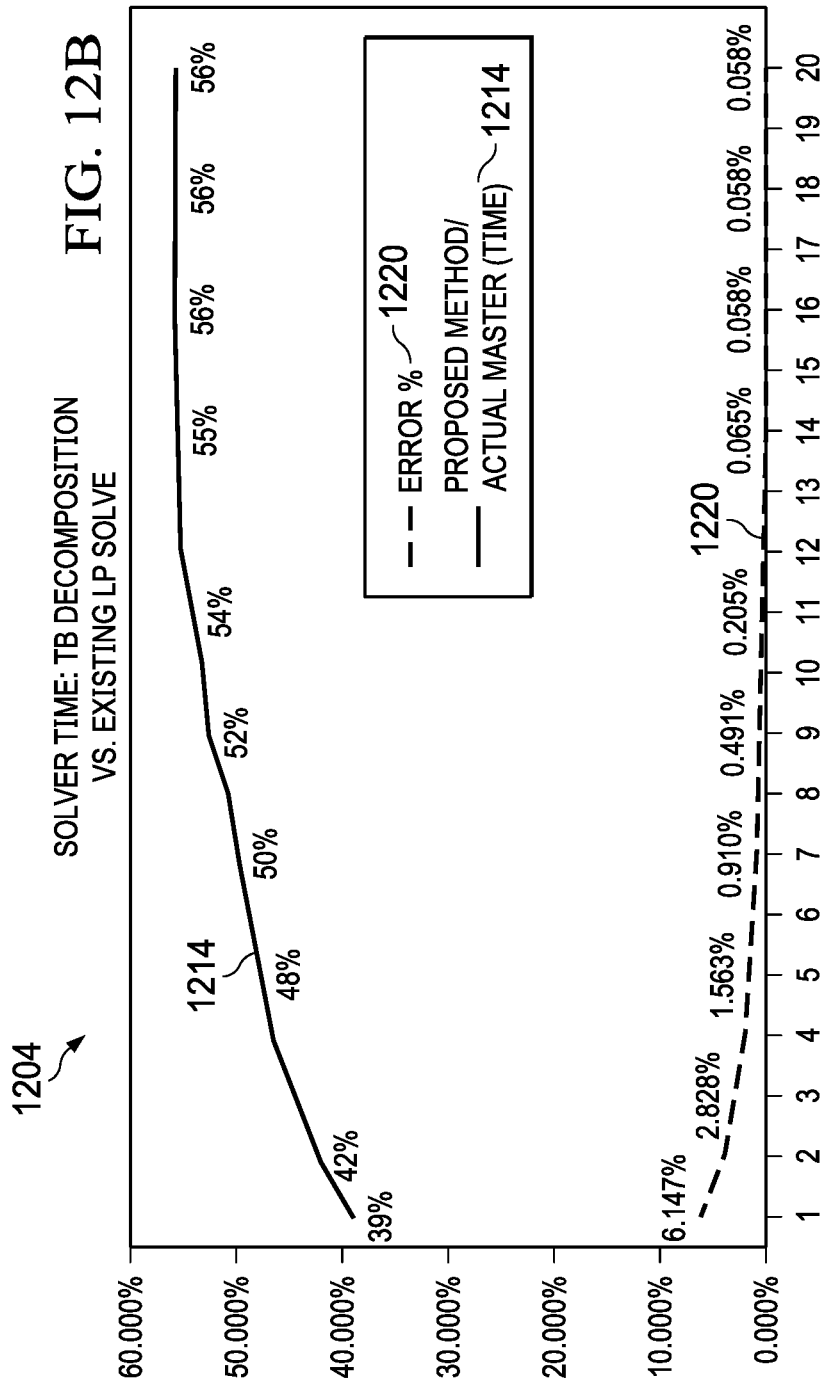

TIME-BASED DECOMPOSITION FOR SUPPLY CHAIN OPTIMIZATION PROBLEM

CROSS-REFERENCE TO RELATED APPLICATIONS

This application is a continuation of is a continuation of U.S. patent application Ser. No. 17/739,861, filed on May 9, 2022, entitled "Time-Based Decomposition for Supply Chain Optimization Problem," which is a continuation of U.S. patent application Ser. No. 16/722,866, filed on Dec. 20, 2019, entitled "Time-Based Decomposition for Supply Chain Optimization Problem," and now U.S. Pat. No. 11,328,229 which claims the benefit under 35 U.S.C. § 119(e) to U.S. Provisional Application No. 62/895,870, filed Sep. 4, 2019, entitled "Time-Based Decomposition for Supply Chain Optimization Problem. And U.S. Provisional Application No. 62/856,283, filed Jun. 3, 2019, entitled "Time-Based Decomposition for Supply Chain Optimization Problem." U.S. patent application Ser. No. 17/739,861, U.S. Pat. No. 11,328,229, and U.S. Provisional Application Nos. 62/895,870 and 62/856,283 are assigned to the assignee of the present application.

TECHNICAL FIELD

The present disclosure relates generally to supply chain planning and specifically to systems and methods of solving supply chain planning problems by time-based decomposition.

BACKGROUND

During supply chain planning, a supply chain plan may be generated by modeling and solving a supply chain planning problem as a single- or multi-objective linear programming (LP) supply chain planning problem. To more efficiently and accurately model lead times, constraints, and demand requirements, many supply chain planning problems are modeled over multiple time periods using time buckets. However, the gains in efficiency and accuracy may be outweighed by increases in solve time and complexity resulting from transforming the LP formulation of the multi-period LP supply chain planning problem into a monolithic LP problem. Unfortunately, monolithic LP problems are generally not amenable to standard decomposition techniques, which often bring improved solving speed. The inability to improve solving speed by decomposing multi-period supply chain planning problems is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 12A-12B illustrate charts comparing the objective value and solve time of an LP optimization method with the time-based decomposition method of FIG. 6 using a parallel solve for a first test case, in accordance with an embodiment.

DETAILED DESCRIPTION

Figure 1:
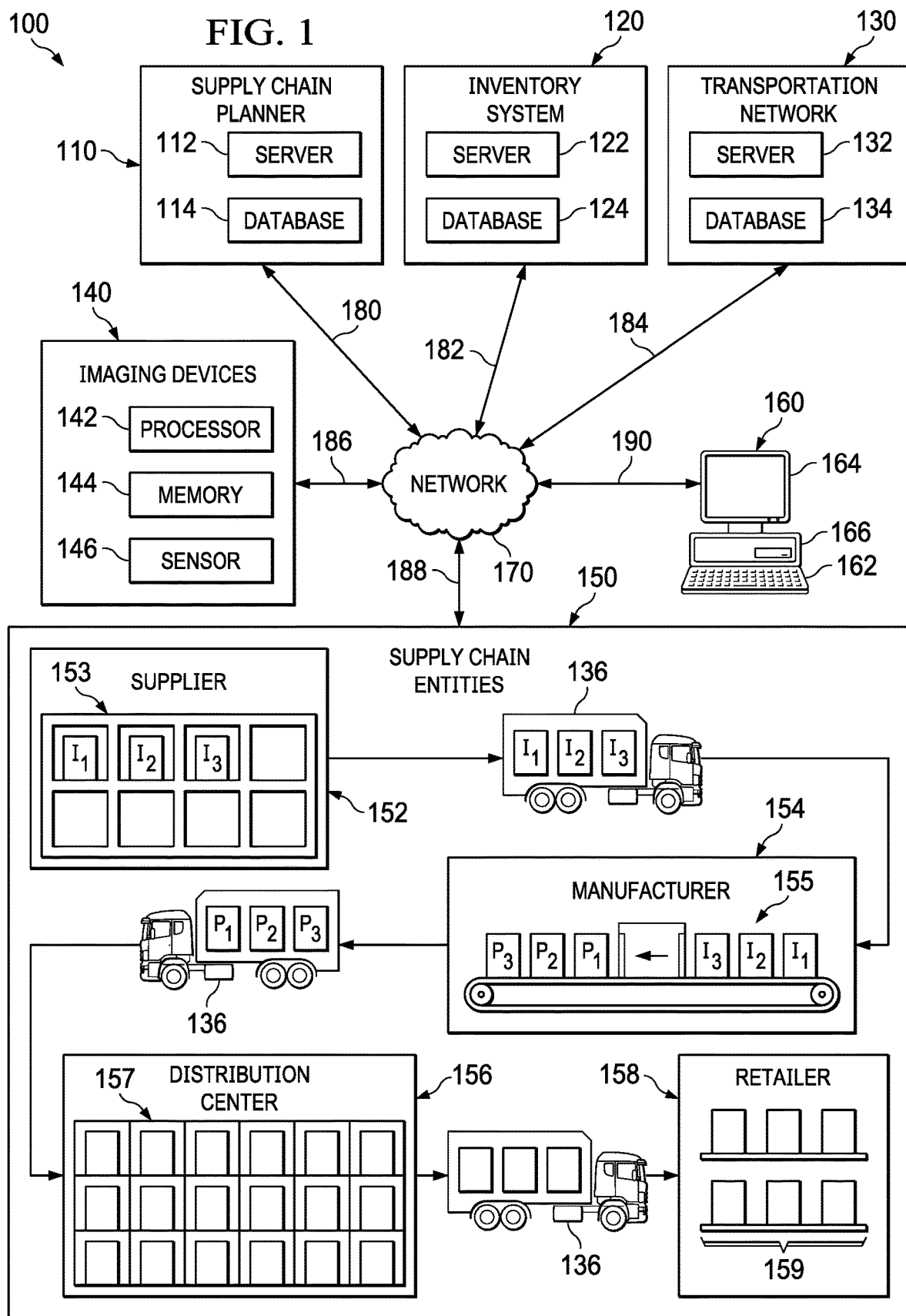
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates exemplary supply chain network 100, in accordance with a first embodiment. Supply chain network 100 comprises supply chain planner 110, inventory system 120, transportation network 130, one or more imaging devices 140, one or more supply chain entities 150, computer 160, network 170, and communication links 180-190. Although a single supply chain planner 110, a single inventory system 120, a single transportation network 130, one or more imaging devices 140, one or more supply chain entities 150, a single computer 160, and a single network 170 are shown and described, embodiments contemplate any number of supply chain planners, inventory systems, transportation networks, imaging devices, supply chain entities, computers, or networks, according to particular needs.

In one embodiment, supply chain planner 110 comprises server 112 and database 114. Server 112 comprises one or more modules to model, generate, and solve a supply chain master planning problem. As described in more detail below, supply chain planner 110 models a supply chain master planning problem as a time-bucketed linear programming (LP) problem comprising LP constraint-variable matrix 702 (see FIG. 7) and calculates globally-optimal LP solution 724 to the supply chain master planning problem from the solutions of time-based decomposed subproblems 722. In one embodiment, supply chain planner 110 models supply chain master planning problem as a multi-objective time-bucketed LP problem. As described in more detail below, solver 204 utilizes masterless iteration with subgradient descent to calculate time-based decomposed subproblems 722 for a lower-priority objective using the optimal basis and a list of variables to be fixed at their upper and lower bounds generated during the solve of a higher-priority objective. Initially, supply chain planner 110 creates a multi-objective LP supply chain master planning problem by mapping the mathematical constraints, objectives, and bounds on variables of the supply chain planning problem to mathematical expressions in the multi-objective LP supply chain master planning problem. After solving, supply chain planner 110 uses this mapping to translate the solution of the multi-objective LP supply chain master planning problem to a supply chain plan.

Inventory system 120 comprises server 122 and database 124. Server 122 of inventory system 120 is configured to receive and transmit product data 216 (see FIG. 2) (including, for example, item identifiers, pricing data, and attribute data), inventory data 220 (including, for example, inventory levels), and other like data about one or more items at one or more locations in supply chain network 100. Server 122 stores and retrieves data about the one or more items from database 124 or from one or more locations in supply chain network 100.

Transportation network 130 comprises server 132 and database 134. According to embodiments, transportation network 130 directs one or more transportation vehicles 136 to ship one or more items between one or more supply chain entities 150, based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein. One or more transportation vehicles 136 comprise, for example, any number of trucks, cars, vans, boats, airplanes, unmanned aerial vehicles (UAVs), cranes, robotic machinery, or the like. One or more transportation vehicles 136 may comprise radio, satellite, or other communication that communicates location information (such as, for example, geographic coordinates, distance from a location, global positioning satellite (GPS) information, or the like) with supply chain planner 110, inventory system 120, transportation network 130, one or more imaging devices 140, and/or one or more supply chain entities 150 to identify the location of one or more transportation vehicles 136 and the location of an item of any inventory or shipment located on one or more transportation vehicles 136.

One or more imaging devices 140 comprise one or more processors 142, memory 144, one or more sensors 146, and may include any suitable input device, output device, fixed or removable computer-readable storage media, or the like.

According to embodiments, one or more imaging devices 140 comprise an electronic device that receives data from one or more sensors 146. One or more sensors 146 of one or more imaging devices 140 may comprise an imaging sensor, such as, a camera, scanner, electronic eye, photodiode, charged coupled device (CCD), or any other electronic component that detects visual characteristics (such as color, shape, size, fill level, or the like) of objects. One or more imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases.

In addition, or as an alternative, one or more sensors 146 may comprise a radio receiver and/or transmitter configured to read from and/or write to an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like device that encodes identifying information. One or more imaging devices 140 may generate a mapping of one or more items in supply chain network 100 by scanning an identifier or device associated with an item and identifying the item based, at least in part, on the scan. This may include, for example, a stationary scanner located at one or more supply chain entities 150 that scans items as the items pass near the scanner. As explained in more detail below, supply chain planner 110, inventory system 120, transportation network 130, and one or more imaging devices 140 may use the mapping of an item to locate the item in supply chain network 100. The location of the item may be used to coordinate the storage and transportation of items in supply chain network 100 according to one or more plans generated by supply chain planner 110 and/or a reallocation of materials or capacity. Plans may comprise one or more of a master supply chain plan, production plan, distribution plan, and the like.

Additionally, one or more sensors 146 of one or more imaging devices 140 may be located at one or more locations local to, or remote from, one or more imaging devices 140, including, for example, one or more sensors 146 integrated into one or more imaging devices 140 or one or more sensors 146 remotely located from, but communicatively coupled with, one or more imaging devices 140. According to some embodiments, one or more sensors 146 may be configured to communicate directly or indirectly with one or more of supply chain planner 110, inventory system 120, transportation network 130, one or more imaging devices 140, one or more supply chain entities 150, computer 160, and/or network 170 using one or more communication links 180-190.

As shown in FIG. 1, supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. Computer 160 may include any suitable input device 162, such as a keypad, mouse, touch screen, microphone, or other device to input information. Output device 164 may convey information associated with the operation of supply chain network 100, including digital or analog data, visual information, or audio information.

Computer 160 may include fixed or removable computer-readable storage media, including a non-transitory computer-readable medium, magnetic computer disks, flash drives, CD-ROM, in-memory device or other suitable media to receive output from and provide input to supply chain network 100. Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. Further examples may also include articles of manufacture including tangible non-transitory computer-readable media that have computer-readable instructions encoded thereon, and the instructions may comprise instructions to perform functions of the methods described herein.

Supply chain planner 110, inventory system 120, transportation network 130, one or more imaging devices 140, and one or more supply chain entities 150 may each operate on one or more separate computers 160, a network of one or more separate or collective computers 160, or may operate on one or more shared computers 160. In addition, supply chain network 100 may comprise a cloud-based computing system having processing and storage devices at one or more locations local to, or remote from, supply chain planner 110, inventory system 120, transportation network 130, one or more imaging devices 140, and one or more supply chain entities 150. In addition, each of one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, supply chain master planning, plan adjustment after supply chain disruptions, order placement, automated warehouse operations (including removing items from and placing items in inventory), robotic production machinery (including producing items), and/or one or more related tasks within supply chain network 100.

One or more supply chain entities 150 may represent one or more suppliers 152, manufacturers 154, distribution centers 156, and retailers 158 of one or more supply chain networks 100, including one or more enterprises. One or more suppliers 152 may be any suitable entity that offers to sell or otherwise provides one or more components to one or more manufacturers 154. One or more suppliers 152 may, for example, receive a product from a first supply chain entity in supply chain network 100 and provide the product to another supply chain entity. One or more suppliers 152 may comprise automated distribution systems 153 that automatically transport products to one or more manufacturers 154 based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more manufacturers 154 may be any suitable entity that manufactures at least one product. One or more manufacturers 154 may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, an item that needs further processing, or any other item. One or more manufacturers 154 may, for example, produce and sell a product to one or more suppliers 152, another one or more manufacturers 154, one or more distribution centers 156, one or more retailers 158, or any other suitable customer or one or more supply chain entities 150. One or more manufacturers 154 may comprise automated robotic production machinery 155 that produce products based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more distribution centers 156 may be any suitable entity that offers to sell or otherwise distributes at least one product to one or more retailers 158, customers, or any suitable one or more supply chain entities 150. One or more distribution centers 156 may, for example, receive a product from a first supply chain entity in supply chain network 100 and store and transport the product for a second supply chain entity. One or more distribution centers 156 may comprise automated warehousing systems 157 that automatically transport an item to, remove an item from, or place an item into inventory of one or more retailers 158, customers, or one or more supply chain entities 150 based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

Although one or more suppliers 152, manufacturers 154, distribution centers 156, and retailers 158 are shown and described as separate and distinct entities, the same entity may simultaneously act as any one or more suppliers 152, manufacturers 154, distribution centers 156, and retailers 158. For example, one or more manufacturers 154 acting as a manufacturer could produce a product, and the same entity could act as one or more suppliers 158 to supply a product to another one or more supply chain entities 150. Although one example of supply chain network 100 is shown and described, embodiments contemplate any configuration of supply chain network 100, without departing from the scope of the present disclosure.

In one embodiment, supply chain planner 110 may be coupled with network 170 using communication link 180, which may be any wireline, wireless, or other link suitable to support data communications between supply chain planner 110 and network 170 during operation of supply chain network 100. Inventory system 120 may be coupled with network 170 using communication link 182, which may be any wireline, wireless, or other link suitable to support data communications between inventory system 120 and network 170 during operation of supply chain network 100. Transportation network 130 may be coupled with network 170 using communication link 184, which may be any wireline, wireless, or other link suitable to support data communications between transportation network 130 and network 170 during operation of supply chain network 100. One or more imaging devices 140 are coupled with network 170 using communication link 186, which may be any wireline, wireless, or other link suitable to support data communications between one or more imaging devices 140 and network 170 during operation of distributed supply chain network 100. One or more supply chain entities 150 may be coupled with network 170 using communication link 188, which may be any wireline, wireless, or other link suitable to support data communications between one or more supply chain entities 150 and network 170 during operation of supply chain network 100. Computer 160 may be coupled with network 170 using communication link 190, which may be any wireline, wireless, or other link suitable to support data communications between computer 160 and network 170 during operation of supply chain network 100.

Although communication links 180-190 are shown as generally coupling supply chain planner 110, inventory system 120, transportation network 130, one or more imaging devices 140, one or more supply chain entities 150, and computer 160 to network 170, each of supply chain planner 110, inventory system 120, transportation network 130, one or more imaging devices 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and computer 160. For example, data may be maintained local to, or external of, supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using network 170 or in any other appropriate manner. For example, data may be maintained in a cloud database at one or more locations external to supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may generate a supply chain plan, including a supply chain master plan. Furthermore, one or more computers 160 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products by manufacturing equipment, proportional or alternative sourcing of one or more supply chain entities 150, and the configuration and quantity of packaging and shipping of items based on the number of items currently in transit in transportation network 130, a supply chain plan, including a supply chain master plan, a solution to a supply chain planning problem, the number of items currently in stock at one or more supply chain entities 150, a forecasted demand, a supply chain disruption, a material or capacity reallocation, current and projected inventory levels at one or more stocking locations, and/or one or more additional factors described herein. For example, the methods described herein may include computers 160 receiving product data 216 from automated machinery having at least one sensor and product data 216 corresponding to an item detected by the automated machinery. Received product data 216 may include an image of the item, an identifier, as described above, and/or product information associated with the item, including, for example, dimensions, texture, estimated weight, and the like. Computers 160 may also receive, from one or more sensors 146 of one or more imaging devices 140, a current location of the identified item.

According to embodiments, the methods may further include computers 160 looking up received product data 216 in a database 114 to identify the item corresponding to product data 216 received from automated machinery. Based on the identification of the item, computers 160 may also identify (or alternatively generate) a first mapping in database 114, where the first mapping is associated with the current location of the identified item. Computers 160 may also identify a second mapping in database 114, where the second mapping is associated with a past location of the identified item. Computers 160 may also compare the first mapping and the second mapping to determine when the current location of the identified item in the first mapping is different than the past location of the identified item in the second mapping. Computers 160 may send instructions to the automated machinery based, at least in part, on one or more differences between the first mapping and the second mapping such as, for example, to locate items to add to, or remove from, an inventory or shipment of one or more supply chain entities 150. In addition, or as an alternative, supply chain planner 110 monitors one or more supply chain constraints of one or more items at one or more supply chain entities 150 and adjusts the orders and/or inventory of one or more supply chain entities 150 at least partially based on one or more detected supply chain constraints.

Figure 2:
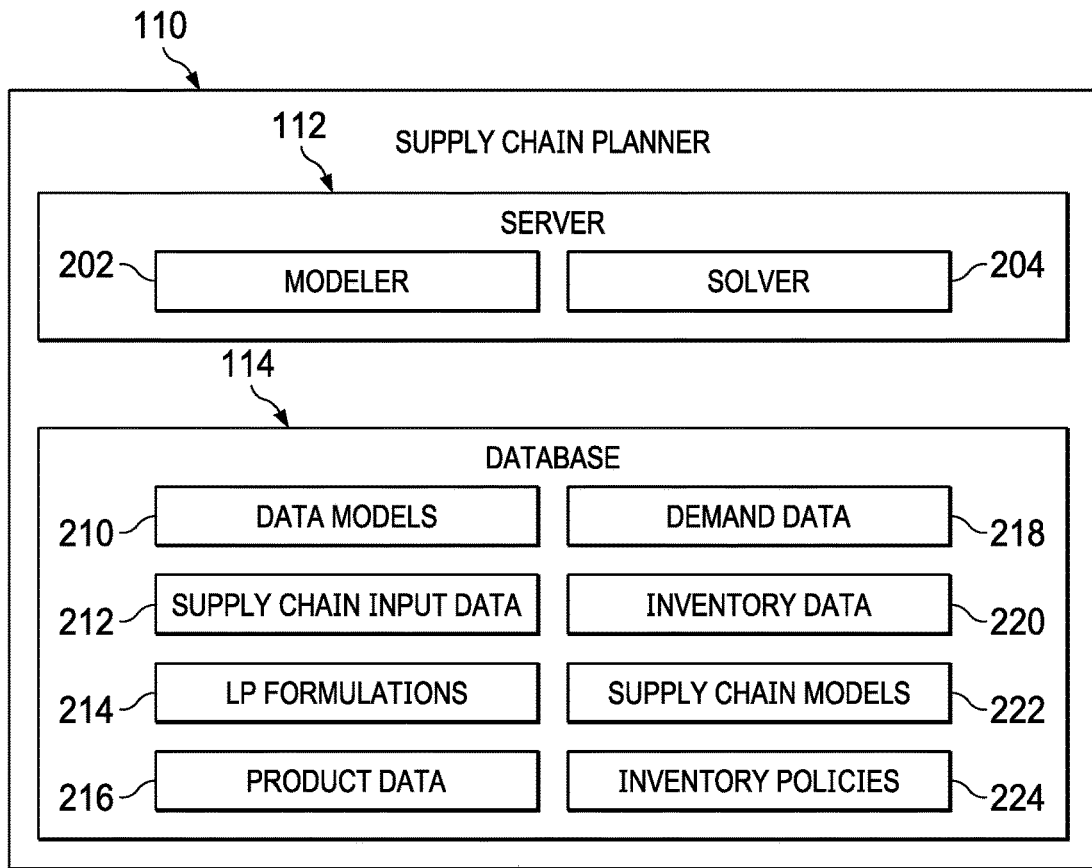
FIG. 2 illustrates the supply chain planner of FIG. 1 in greater detail, in accordance with an embodiment.

FIG. 2 illustrates supply chain planner 110 of FIG. 1 in greater detail, in accordance with an embodiment. As discussed above, supply chain planner 110 comprises server 112 and database 114. Although supply chain planner 110 is shown as comprising a single server 112 and a single database 114, embodiments contemplate any suitable number of servers or databases internal to, or externally coupled with, supply chain planner 110.

Server 112 of supply chain planner 110 may comprise modeler 202 and solver 204. Although server 112 is shown and described as comprising a single modeler 202 and a single solver 204, embodiments contemplate any suitable number or combination of these located at one or more locations, local to, or remote from supply chain planner 110, such as on multiple servers or computers at any location in supply chain network 100.

As discussed in more detail below, modeler 202 may model one or more supply chain planning problems, such as a master planning problem, of supply chain network 100. According to embodiments, modeler 202 of server 112 identifies resources, operations, buffers, and pathways, and maps supply chain network 100 as data models 210. For example, modeler 202 of server 112 models a multi-period supply chain master planning problem that represents supply chain network 100 as a hierarchical multi-objective time-bucketed LP supply chain master planning problem comprising mathematical objective functions that represent business objectives, mathematical constraints that represent supply chain constraints, and lower and/or upper bounds on decision variables representing supply chain data 214. According to embodiments, mathematical objective functions represent business objectives, such as, for example, minimizing the quantity of unmet demand, minimizing usage of alternate resources (e.g. maximizing usage of primary resources), planning items as just-in-time (JIT) as possible (e.g. minimizing the amount of carried-over items), and the like. Mathematical constraints represent limitations to capacity, materials, lead times, and the like. Lower and upper bounds comprise minimum and maximum values for decision variables (such as, for example, capacity can only be used for ten hours per day, then ten hours may be the upper bound on the capacity usage). According to embodiments, different mathematical forms may be used to represent LP problems. According to embodiments, LP constraint-variable matrix 702 comprises a sparse matrix having one or more rows, representing LP supply chain planning constraints, and one or more columns, representing the variables for those constraints. In addition, the multi-period matrix formulation and/or LP constraint-variable matrix 702 may comprise one or more additional rows or columns in the same matrix, one or more other matrices, one or more submatrices, and the like, which may store other components associated with LP problem, such as, for example, objectives, lower/upper bounds, and the like, according to particular needs.

According to embodiments, solver 204 of supply chain planner 110 generates a solution to the supply chain master planning problem using time-based decomposition to generate at least two time-based decomposed subproblems. Solver 204 maps constraints and variables from LP constraint-variable matrix 702 to time buckets and identifies variables crossing boundaries between consecutive time-buckets. Solver 204 may select decomposition boundaries 720 by identifying one or more time-bucket boundaries between consecutive time buckets that balance the portions of the supply chain master planning problem that is represented by each time-based decomposed subproblem 722 while minimizing the number of variables that cross over the one or more decomposition boundaries 720. Based, at least in part, on the selected decomposition boundaries 720, solver 204 formulates time-based decomposed subproblems 722 and solves using LP optimization followed by method 900 of masterless iteration with subgradient descent (see FIG. 9) to generate globally-optimal LP solution 724, as described in greater detail below.

Database 114 of supply chain planner 110 may comprise one or more databases or other data storage arrangement at one or more locations, local to, or remote from, server 112. Database 114 comprises, for example, data models, 210 supply chain input data 212, LP formulations 214, product data 216, demand data 218, inventory data 220, supply chain models 222, and inventory policies 224. Although database 114 is shown and described as comprising data models 210, supply chain input data 212, LP formulations 214, product data 216, demand data 218, inventory data 220, supply chain models 222, and inventory policies 224, embodiments contemplate any suitable number or combination of these, located at one or more locations, local to, or remote from, supply chain planner 110 according to particular needs.

As an example only and not by way of limitation, database 114 stores data models 210, which represent the flow of materials through one or more supply chain entities 150 of supply chain network 100. Modeler 202 of supply chain planner 110 may model the flow of materials through one or more supply chain entities 150 of supply chain network 100 as one or more data models 210 comprising, for example, a network of nodes and edges. Material storage and/or transition units may be modeled as nodes, which may be referred to as buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as edges connecting the nodes. Each edge may represent the flow, transportation, or assembly of materials (such as items or resources) between the nodes by, for example, production processing or transportation. A planning horizon for the data models 210 may be broken down into elementary time-units, such as, for example, time-buckets, or, simply, buckets. The edge between two buffer nodes denote processing of material and the edge between different buckets for the same buffer indicates inventory carried forward. Flow-balance constraints for most, if not every buffer in every bucket, model the material movement in supply chain network 100.

Supply chain input data 212 may comprise various decision variables, business constraints, goals, and objectives of one or more supply chain entities 150. According to some embodiments, supply chain input data 212 may comprise hierarchical objectives specified by, for example, business rules, master planning requirements, scheduling constraints, and discrete constraints, including, for example, sequence-dependent setup times, lot-sizing, storage, shelf life, and the like.

LP formulation 214 of database 114 include a single- or multi-objective LP supply chain master planning problem, matrix formulations of the LP supply chain master planning problem, any decomposed subproblems as well as any associated data and mappings used to formulate or solve an LP problem, such as, for example, LP constraint-variable matrix 702, time bucket data 704, time-bucket-to-variable map 706, time-bucket-to-constraint map 708, variable positive coefficient constraint map 710, variable negative coefficient constraint map 712, variable-start-bucket map 714, variable-end bucket map 716, variable-bucket-crossover-matrix 718, decomposition boundary 720, time-based decomposed subproblems 722, globally-optimal LP solution 724, and hierarchical objectives and fixed variables 726. According to one embodiment, LP constraint-variable matrix 702 comprises a matrix formulation of an LP supply chain master planning problem having constraints expressed by rows, variables represented by columns, and each element comprising the coefficient of the variable for each constraint. As described in further detail below, supply chain planner 110 analyzes supply chain data models 210, supply chain input data 212, and LP constraint-variable matrix 702 to generate time bucket data 704 comprising the identity of variables and constraints present in each time bucket Additionally, supply chain planner 110 may use LP constraint-variable matrix 702 and time-bucket data 704 to generate time-bucket-to-variable map 706, time-bucket-to-constraint map 708, variable positive coefficient constraint map 710, variable negative coefficient constraint map 712, variable-start-bucket map 714, variable-end bucket map 716, variable-bucket-crossover-matrix 718, and decomposition boundary 720. Time-based decomposed subproblems 722 may comprise matrix formulations having constraints expressed by rows, variables represented by columns, and each element comprising the coefficient of the variable for each constraint. Supply chain planner 110 creates time-based subproblems 722 by decomposing LP constraint variable matrix 702 at decomposition boundary 720, solves time-based subproblems 722, generates globally-optimal LP solution 724, and updates time-based subproblems 722 according to hierarchical objectives and fixed variables 726.

Product data 216 of database 114 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 216 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Demand data 218 of database 114 may comprise, for example, any data relating to past sales, past demand, purchase data, promotions, events, or the like of one or more supply chain entities 150. Demand data 218 may cover a time interval such as, for example, by the minute, hour, daily, weekly, monthly, quarterly, yearly, or any suitable time interval, including substantially in real time. According to embodiments, demand data 218 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 220 of database 114 may comprise any data relating to current or projected inventory quantities or states, order rules, or the like. For example, inventory data 220 may comprise the current level of inventory for each item at one or more stocking locations across supply chain network 100. In addition, inventory data 220 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 220 in database 114, which may be used by supply chain planner 110 to place orders, set inventory levels at one or more stocking points, initiate manufacturing of one or more items (or components of one or more items), or the like. In addition, or as an alternative, inventory data 220 may be updated by receiving current item quantities, mappings, or locations from inventory system 120, transportation network 130, one or more imaging devices 140, and/or one or more supply chain entities 150.

Supply chain models 222 of database 114 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). Additionally, or in the alternative, supply chain models 222 may comprise characteristics that specify the supply chain structure in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to different supply chain models 222.

Inventory policies 224 of database 114 may comprise any suitable inventory policy describing the reorder point and target quantity, or other inventory policy parameters that set rules for supply chain planner 110 to manage and reorder inventory. Inventory policies 224 may be based on target service level, demand, cost, fill rate, or the like. According to embodiment, inventory policies 224 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although, a particular target service level and percentage is described; embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to determine or receive inventory to replace the depleted inventory.

Figure 3:
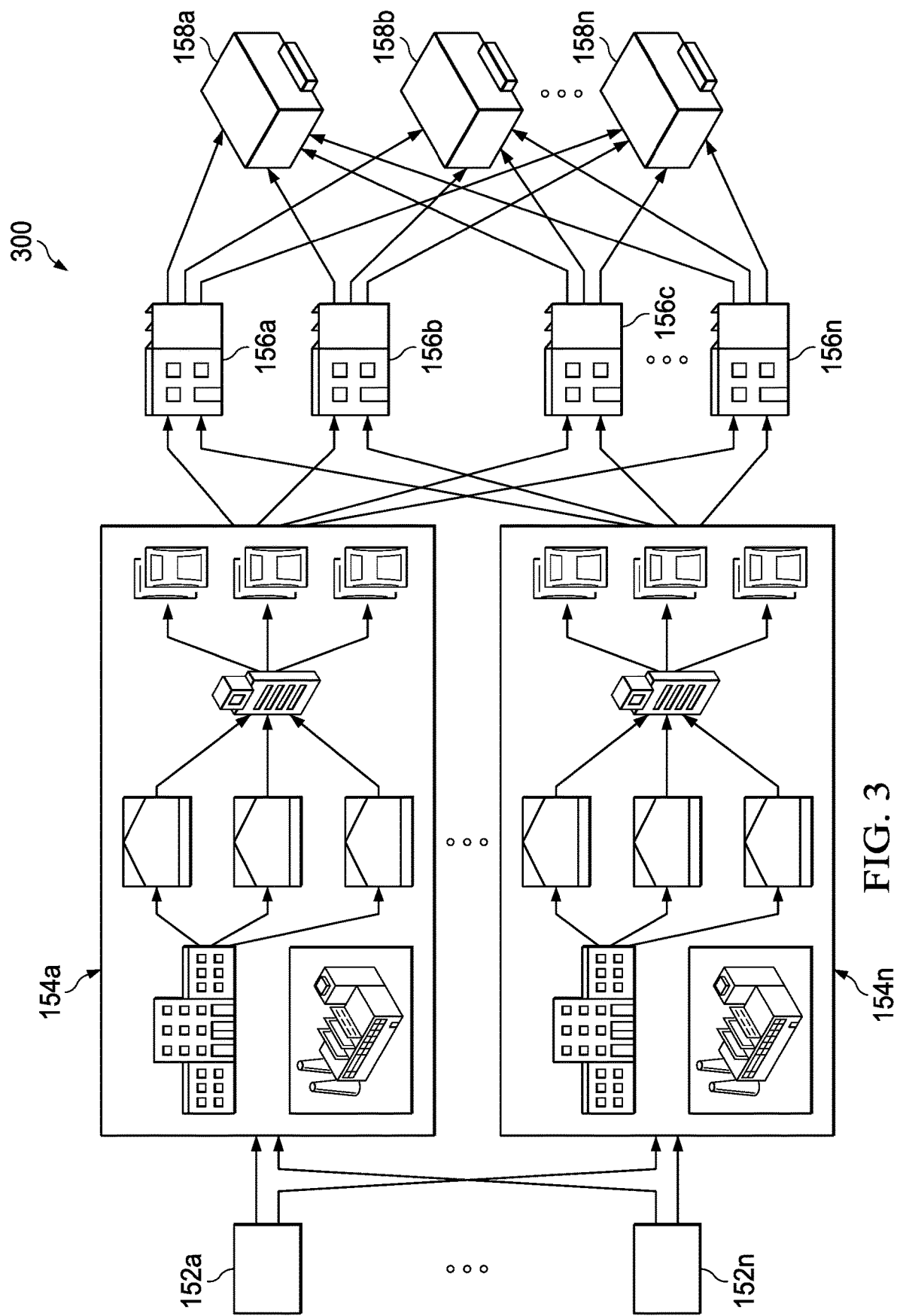
FIG. 3 illustrates an exemplary simplified supply chain network, in accordance with an embodiment.

FIG. 3 illustrates an exemplary simplified supply chain network 300, in accordance with an embodiment. Exemplary simplified supply chain network 300 comprises two or more suppliers 152a-152n, two or more manufacturers 154a-154n, four or more distribution centers 156a-156n, and three or more retailers 158a-158n. Two or more manufacturers 154a-154n receive items from two or more suppliers 152a-152n for production processes 302a-302n. Production processes 302a-302n comprise various operations for processing items, intermediate items, and finished goods, which may comprise one or more products transported to four or more distribution centers 156a-156n. Four or more distribution centers 156a-156n may transport products to three or more retailers 158a-158n. The flow of materials, items, and products among the two or more suppliers 152a-152n, two or more manufacturers 154a-154n, four or more distribution centers 156a-156n, and three or more retailers 158a-158n of exemplary simplified supply chain network 300 must meet demand requirements while being limited by constraints of capacity, materials, lead times, transportation, sourcing, and/or the like.

According to embodiments, to create a supply chain planning problem, modeler 202 models exemplary supply chain network 300 to represent the flow of materials and resources in accordance with the constraints at each time bucket, which provides efficient and almost-accurate modelling of various process lead times, material and capacity constraints, and demand requirements. Although a simplified exemplary supply chain network 300 is illustrated as comprising two or more suppliers 152a-152n, two or more manufacturers 154a-154n, four or more distribution centers 156a-156n, and three or more retailers 158a-158n, supply chain network 100 may comprise any number of one or more supply chain entities 150, according to particular needs. For example, supply chain network 100 often comprises multiple manufacturing plants located in different regions or countries. In addition, an item may be processed from many materials by many operations into a large number of different intermediate goods and/or finished items, where the different operations may have multiple constrained resources and multiple input items, each with their own lead, transportation, production, and cycle times. Additionally, materials and resources may flow upstream, downstream, or both.

Figure 4:
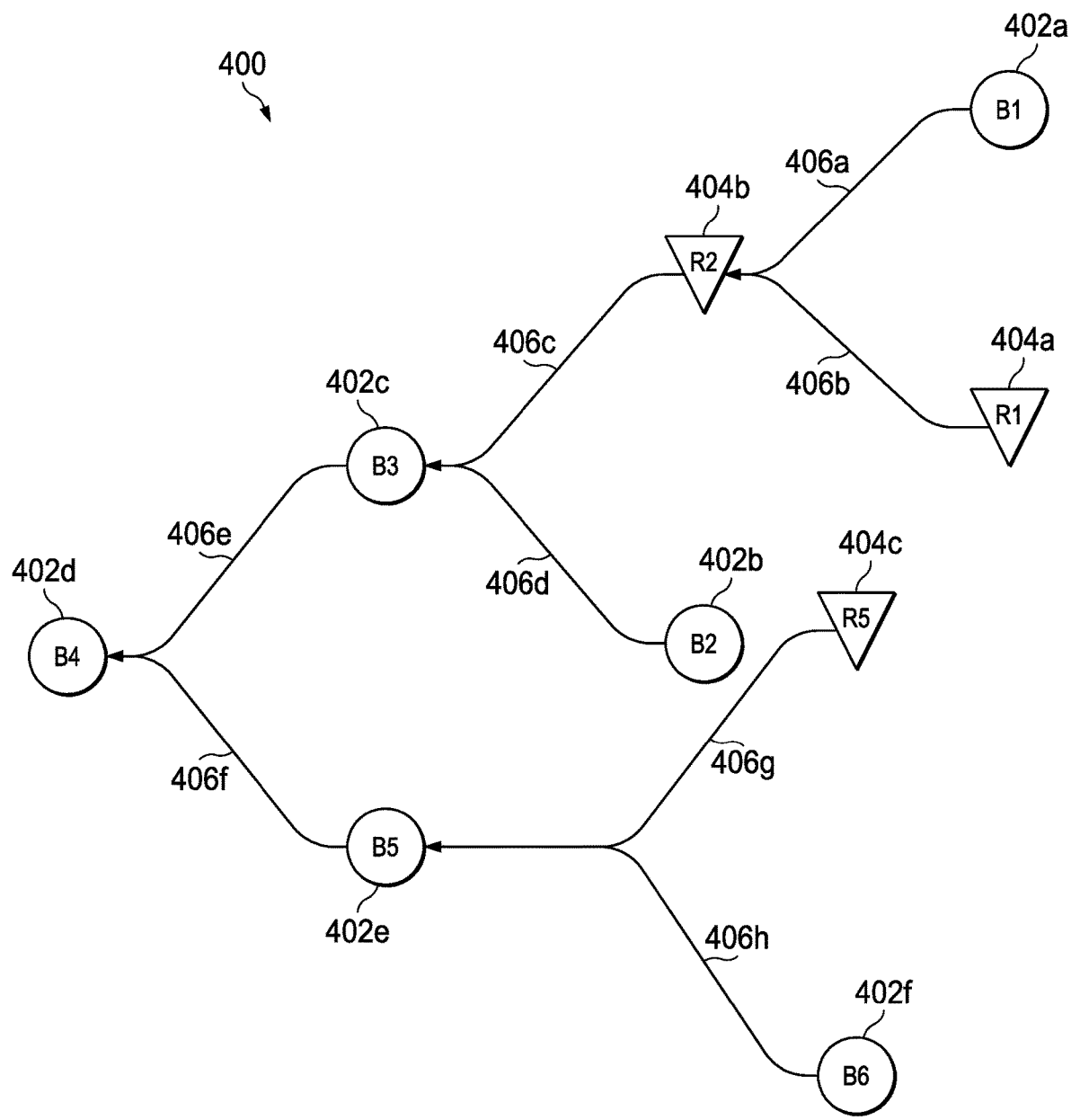
FIG. 4 illustrates a single-period supply chain graph, in accordance with an embodiment.

FIG. 4 illustrates single-period supply chain graph 400, in accordance with an embodiment. Single-period supply chain graph 400 comprises a graphical representation of a single-period of a supply chain data model 210. Single-period supply chain graph 400 comprises a series of nodes and edges illustrating the flow of materials and resources for a single time bucket. As discussed above with respect to data models 210, modeler 202 models supply chain network 100 as a network of nodes and edges. In this example, material buffer nodes 402a-402f are represented by circles (e.g. B1, B2, B3, B4, B5, and B6), and indicate a particular material at a particular location in supply chain network 100. Nodes representing resource buffer nodes 404a-404c may be represented by triangles (e.g. R1, R2, and R5), and indicate a resource or operation having a particular capacity, such as, for example, transportation, manufacturing, or other activities. Various transportation or manufacturing processes are modeled as edges 406a-406h connecting material buffer nodes 402a-402f and resource buffer nodes 404a-404c. By way of further example only and not by way of limitation, edges 406a-406b connecting material buffer node B1 402a and resource buffer node R1 404a to resource buffer node R2 404b, indicate that a supply of materials from material buffer B1 and a capacity of a resource at resource buffer R1 are consumed to generate the resource represented by resource buffer R2.

Figure 5:
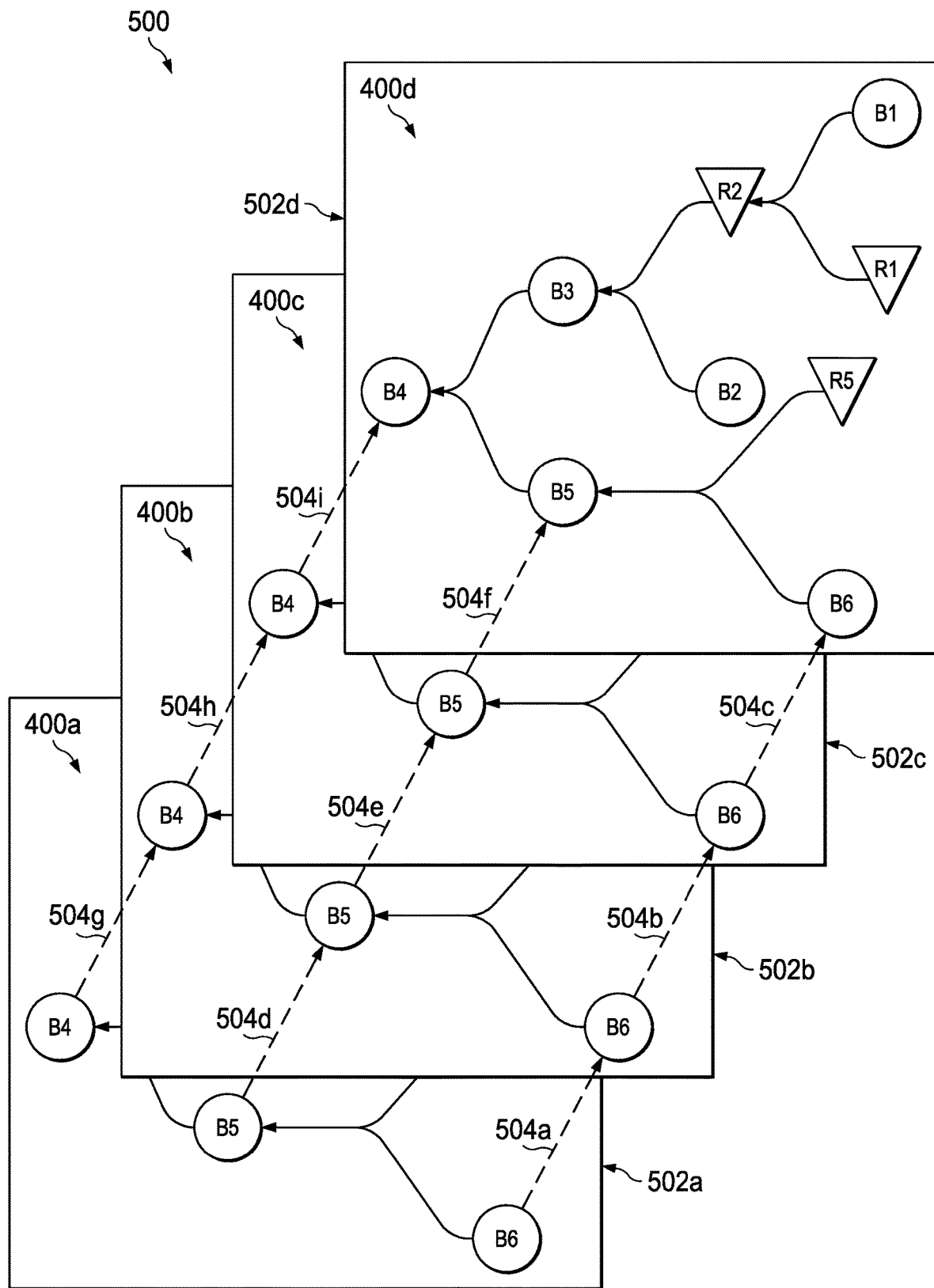
FIG. 5 illustrates a multi-period supply chain graph, in accordance with an embodiment.

FIG. 5 illustrates multi-period supply chain graph 500, in accordance with an embodiment. Multi-period supply chain graph 500 comprises a graphical representation of a multi-period supply chain data model 210. Multi-period supply chain graph 500 comprises a planning horizon divided into time buckets, represented by leaves 502a-502d, each of 502a-502d. Each of leaves 502a-502d comprise one single-period supply chain graph 400a-400d. Arcs 504a-504i crossing between leaves 502a-502d represent materials and resources flowing between nodes of different time buckets. For example, arcs 504a-504i between material buffer nodes 402a-402f and resource buffer nodes 404a-404c in different time buckets represent materials and resources flowing from a node in one time bucket to a node in another time bucket. The flow of materials and resources between nodes in different time buckets indicates the time needed to complete the operation (such as, for example, to transform a first item into a different item, transport an item at a first location to the same item at a second location, and other like operations) is longer than the time period represented by the timer bucket. Multi-period supply chain graph 500 comprises a planning horizon with four time buckets and three time bucket boundaries. A planning horizon is the duration of the time period covered by the supply chain planning problem, such as, for example, one year. The planning horizon is divided into discrete time periods referred to as time buckets, which may comprise, for example, daily buckets, weekly buckets, monthly buckets, quarterly buckets, or the like. Although the planning horizon is described as one year and the time buckets are described as daily buckets, weekly buckets, monthly buckets, or quarterly buckets, embodiments contemplate a planning horizon comprising any suitable planning period divided into any number of time buckets having time periods of any suitable duration, according to particular needs.

As stated above, supply chain planner 110 models a supply chain planning problem as an LP supply chain master planning problem. Supply chain planner 110 may decompose a large LP supply chain master planning problem into two or more time-based decomposed subproblems 722 by dividing the large LP supply chain master planning problem at decomposition boundaries 720. Decomposition boundaries 720 comprise one or more time-bucket boundaries between subsequent time buckets selected to generate time-based decomposed subproblems 722 and splitting the variables that cross over the time-bucket boundary. When a large LP supply chain master planning problem is decomposed into time-based decomposed subproblems 722, supply chain planner 110 generates globally-optimal LP solution 724 faster than LP optimization of the LP supply chain master planning problem. After calculating a first globally-optimal LP solution 724, solver 204 uses hierarchical oblevels and fixed variables 726 to generate time-based decomposed subproblems 722 for optimization of a second, third, or any number of further objectives, according to particular needs. Although single period supply chain graph 400 and multi-period supply chain graph 500 are shown and described as having a particular number of buffers and resources with a defined flow between them, embodiments contemplate any number of buffers, resources, and operations with any suitable flow between them, including any number of material buffer nodes 402a-402f, resource buffer nodes 404a-404c, edges 406a-406h, and arcs 504a-504i, according to particular needs.

Figure 6:
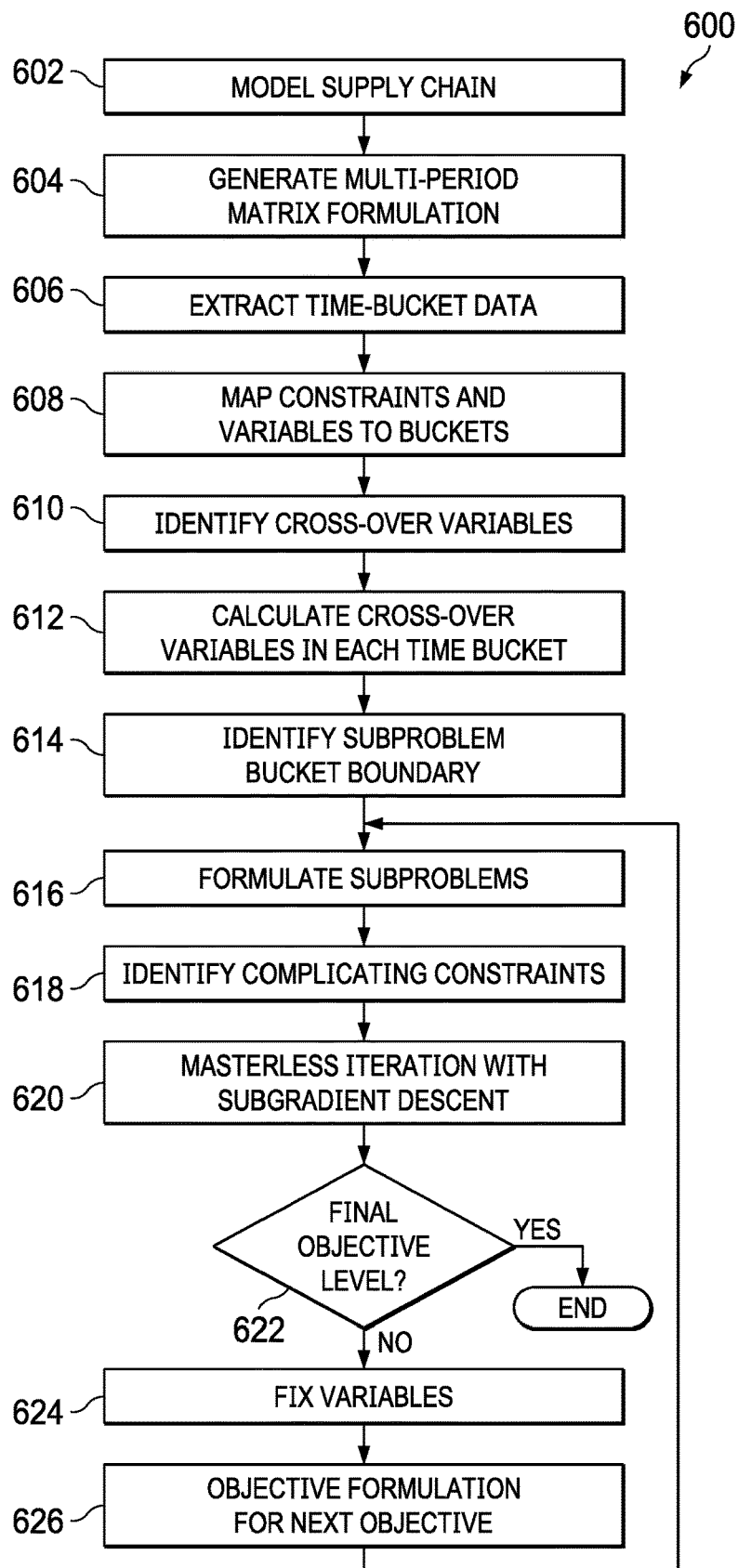
FIG. 6 illustrates a time-based decomposition method, in accordance with an embodiment.

FIG. 6 illustrates time-based decomposition method 600, in accordance with an embodiment. Method 600 proceeds by one or more activities, which although described in a particular order, may be performed in one or more permutations, according to particular needs.

Method 600 begins at action 602, where modeler 202 of supply chain planner 110 models a supply chain according to supply chain network 100. According to embodiments, modeler 202 models a supply chain using data models 210 by mapping resources, operations, buffers, and pathways of supply chain network 100. By way of explanation only and not by way of limitation, an example of time-based decomposition method 600 is described in connection with exemplary workflow 700.

Figure 7:
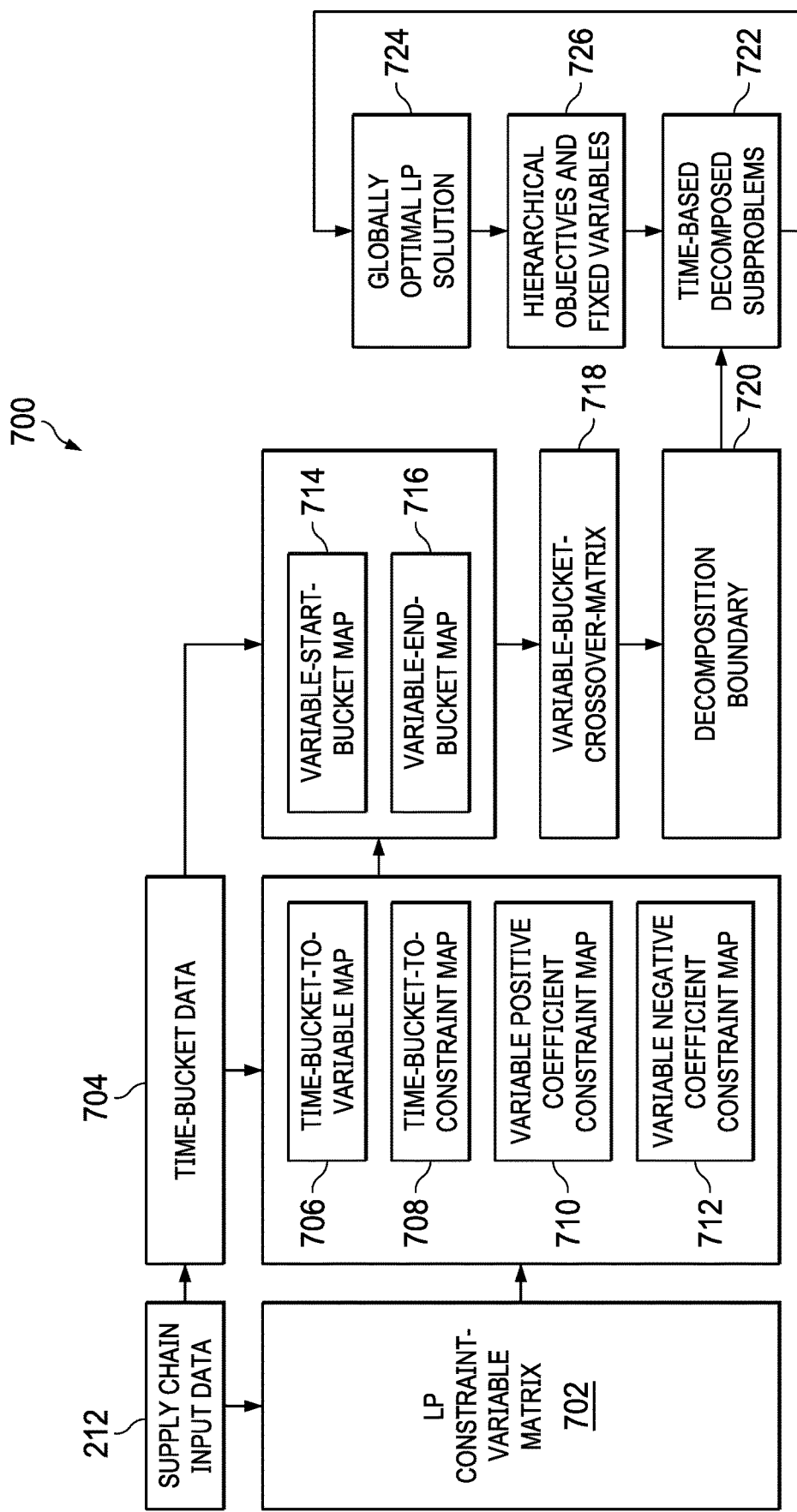
FIG. 7 illustrates an exemplary workflow of the time-based decomposition method of FIG. 6, in accordance with an embodiment.

FIG. 7 illustrates exemplary workflow 700 of time-based decomposition method 600 of FIG. 6, in accordance with an embodiment. Exemplary workflow 700 illustrates processing the structures of various data (such as, for example, mappings, matrices, calculated values, solutions, and the like) according to an exemplary embodiment of time-based decomposition method 600. For example, as stated above, at action 602, modeler 202 models a supply chain using one or more data models 210. After modeling the supply chain, modeler 202 generates a multi-period matrix formulation of the supply chain planning problem at action 604 using supply chain input data 212. As stated above, modeler 202 generates a multi-period matrix formulation comprising LP constraint-variable matrix 702. As stated above, LP constraint-variable matrix 702 comprises a sparse matrix having one or more rows, representing LP supply chain planning constraints, and one or more columns, representing the variables for those constraints.

At action 606, modeler 202 extracts time-bucket data 704 from supply chain input data 212. Continuing with exemplary workflow 700, modeler 202 extracts time-bucket data 704 from supply chain input data 212. Time-bucket data 706 comprises operation-, resource-, and/or material-related planning data organized into buckets of any suitable time period division of a planning horizon.

At action 608, modeler 202 maps constraints and variables to time buckets using LP constraint-variable matrix 702 and time-bucket data 704 to generate time-bucket-to-variable map 706, time-bucket-to-constraint map 708, variable positive coefficient constraint map 710, and variable negative coefficient constraint map 712. According to embodiments, time-bucket-to-variable map 706 and time-bucket-to-constraint map 708 comprise data mappings between each time bucket of a planning horizon to the variables and constraints of LP constraint-variable matrix 702. In addition, variable positive coefficient constraint map 710 and variable negative coefficient constraint map 712 comprise data mappings between each variable coefficient that is positive in a particular time bucket and each variable coefficient that is negative in a particular time bucket. At action 610, modeler 202 uses variable positive coefficient constraint map 710 and variable negative coefficient constraint map 712 as well as time-bucket data 706 to identify the variables starting in each time bucket and the variables ending in each time bucket, which modeler 202 stores as variable-start bucket map 714 and variable end-bucket map 716. Variables that begin in one time bucket and end in another time bucket are referred to as cross-over variables. Cross-over variables may be identified by having a negative coefficient in one constraint related to a particular time bucket and a positive coefficient in another constraint related to another time bucket. Modeler 202 uses the signs of the coefficients from variable positive coefficient constraint map 710 and variable negative coefficient constraint map 712 to calculate variable-start-bucket map 716 and variable-end-bucket map 718.

At action 612, modeler 202 calculates the quantity of variables that are crossing over time-bucket boundaries, which is stored as variable-bucket-crossover-matrix 718. In variable-bucket-crossover matrix 718, modeler 202 quantifies, for each constraint and each time bucket, the quantity of variables that cross-over time-bucket boundaries, and which variables end in each bucket. Embodiments contemplate variables crossing over more than two time buckets, such as, for example, variables for lateable products, quantifying the amount of allowable lateness, and variables for product line expansions (which could be in each bucket).

At action 614, modeler 202 identifies one or more decomposition boundaries 720 between time-based decomposition subproblems 722. According to an embodiment, modeler 202 uses variable-bucket-crossover-matrix 718 comprising the identity and/or quantity of cross-over variable to select one or more time-bucket boundaries as one or more decomposition boundaries 720. According to one embodiment, modeler 202 selects one or more decomposition boundaries 720 as the time-bucket boundaries having a minimum quantity of the cross-over variables. In addition, supply chain planner 110 may select one or more decomposition boundaries 720 by considering one or more additional factors, such as, for example, creating balanced time-based decomposed subproblems of similar size and complexity from the original multi-period LP supply chain master planning problem. Embodiments contemplate repeating action 614 one or more additional times to further divide the problem into a larger quantity of subproblems.

At action 616, modeler 202 formulates time-based decomposed subproblems 722 by dividing the original multi-period LP supply chain master planning problem at one or more decomposition boundaries 720 and generating at least two independent subproblems sharing, as their common element, one or more complicating constraints. According to one embodiment, each of time-based decomposed subproblems 722 comprise LP optimization problems and may be represented by a multi-period matrix formulation and solved at the matrix level.

At action 618, modeler 202 identifies complicating constraints. After modeler 202 splits the original multi-period LP supply chain master planning problem at one or more decomposition boundaries 720 to formulate time-based decomposed subproblems 722, modeler 202 may identify complicating constraints to initialize the RHS (Right-Hand Side) of the time-based decomposed subproblems 722 so that the sum of the RHS of time-based decomposed subproblems 722 is equal to the RHS of the original multi-period LP supply chain master planning problem, as described in further detail below. According to an embodiment, modeler 202 identifies complicating constraints by checking constraints for variables that are both before and after decomposition boundaries 720.

Figure 8:
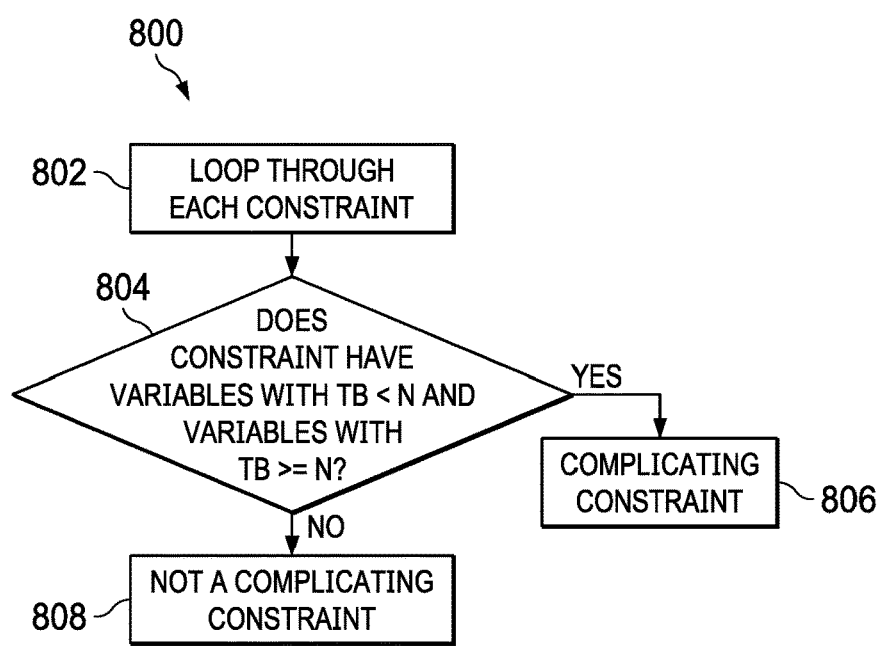
FIG. 8 illustrates a decision diagram for identifying complicating constraints, in accordance with an embodiment.

FIG. 8 illustrates decision diagram 800 for identifying complicating constraints, in accordance with an embodiment. According to embodiments, modeler 202 identifies complicating constraints at action 618 by evaluating variables to determine whether they affect time buckets (TB) before one or more decomposition boundaries 720 (TB<N), on or after one or more decomposition boundaries 720 (TB≥N), or both. Modeler 202 may loop through each constraint in a subproblem at action 802, and evaluate for each constraint, whether the constraint has both (1) a variable on or after the one or more decomposition boundaries 720 and (2) a variable before the one or more decomposition boundaries 720 at action 804. When the constraint has variables on both sides of one or more decomposition boundaries 720 (i.e. the constraint crosses over one or more decomposition boundaries 720), the supply chain planner 110 determines the constraint is a complicating constraint at action 806. Otherwise, supply chain planner 110 determines the constraint is not a complicating constraint at action 808.

At action 620, solver 204 generates globally-optimal LP solution 724 by masterless iteration with subgradient descent of the time-based decomposed subproblems 722. As explained in further detail below, solver 204 allocates all of the capacity or material of the complicating constraint of the LP supply chain master planning problem to the complicating constraints of the time-based decomposed subproblems 722, such that the total capacity and material allocated to time-based decomposed subproblems 722 equals 100% of the capacity or material of the LP supply chain master problem.

As stated above, modeler 202 initializes the RHS of time-based decomposed subproblems 722 so that the sum of the RHS of time-based decomposed subproblems 722 is equal to the RHS of the original multi-period LP supply chain master planning problem. According to one embodiment, solver 204 updates the RHS of complicating constraints, iteratively, and tries to find the best assignment using dual values, to achieve the optimum solution, as explained in further detail below.

At action 622, solver 204 checks whether the current objective level is the final objective level of the supply chain planning problem. When the current objective level is the final objective, method 600 ends. When the current objective level is not the final objective level, method 600 continues to action 624, where solver 204 calculates the reduced cost and updates the upper and lower bounds for the current objective level. At action 626, solver 204 accesses the objective formulation for the next objective, and returns to action 616, where solver 204 updates time-based decomposed subproblems. Solver 204 of supply chain planner 110 may solve time-based decomposed subproblems 722 by iteratively loading and solving the time-based decomposed subproblems 722 for each objective in accordance with an order described by a hierarchy of the objectives. A hierarchy of the objectives indicates that the hierarchical objectives are solved in the order indicated by the hierarchy, from an objective higher in the hierarchy (higher order or higher priority objective) to an objective lower in the hierarchy (lower order or lower priority objective). The hierarchical order of the objectives may indicate the order of importance of the objectives (i.e. the first objective is more important than the second objective; the second objective is more important than the third objective etc.). When solving time-based decomposed subproblems 722 for one or more lower objectives, solver 204 sets decision variables at their upper or lower bounds (which may be referred to as variable fixing) to retain the objective value of one or more higher objectives. After solving time-based decomposed subproblems 722 for a current objective and using masterless iteration with subgradient descent to generate globally-optimal LP-solution 724, solver 204 updates variables to be fixed at their upper or lower bounds. Solver 204 may then iteratively repeat solving time-based decomposed subproblems 722 for each objective following this technique until solver 204 solves all objectives of the multi-objective hierarchical LP supply chain master planning problem or one or more stopping criteria is reached, as described below.

Figure 9:
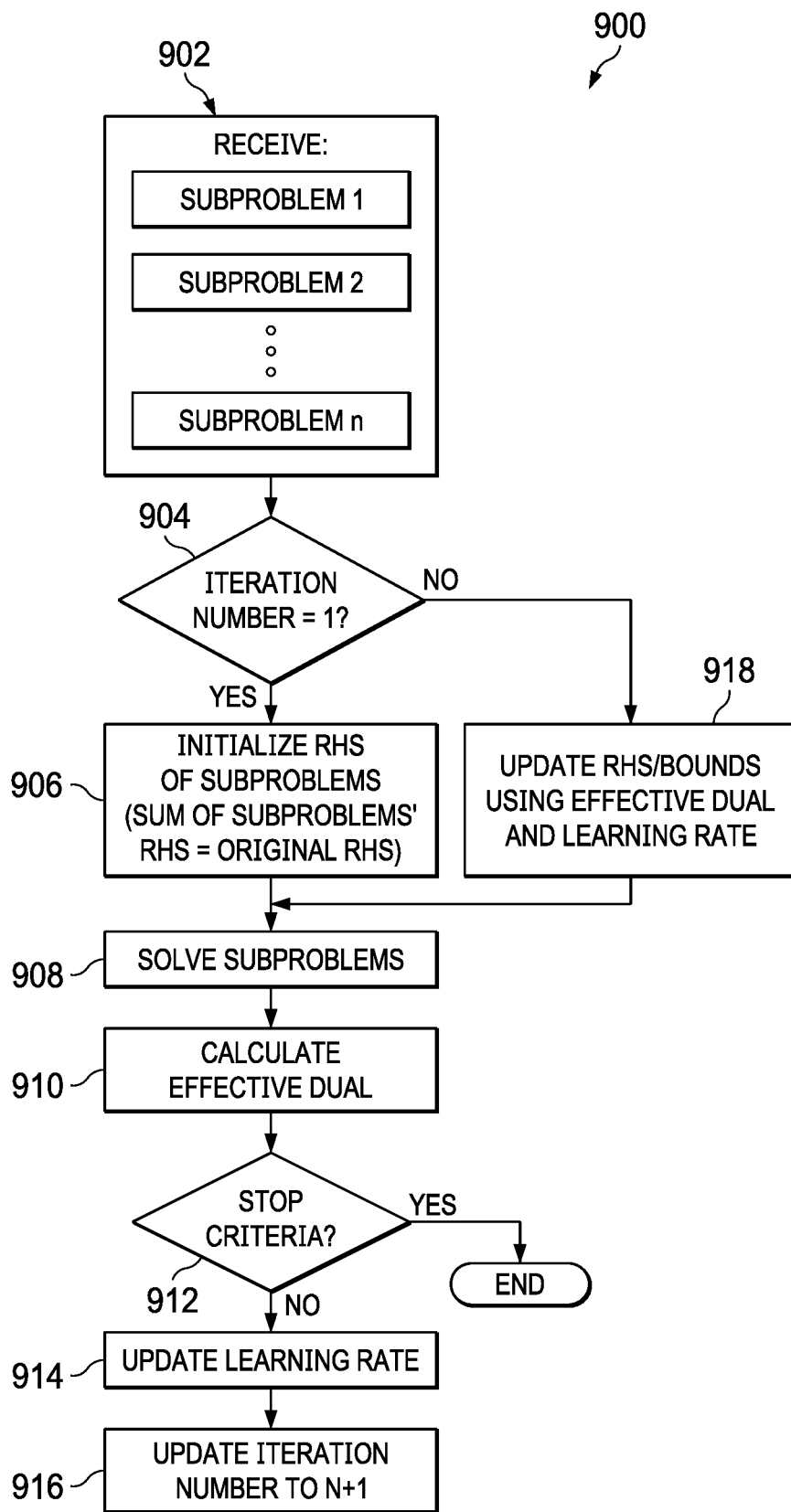
FIG. 9 illustrates a method of masterless iteration with subgradient descent in accordance with an embodiment.

FIG. 9 illustrates method 900 of masterless iteration with subgradient descent in accordance with an embodiment. As discussed herein, method 900 generates globally-optimal LP solution 724 to the original multi-period LP supply chain master planning problem without solving the LP supply chain master planning problem. Instead, solver 204 solves each of time-based decomposed subproblems 722 using LP optimization and finding a globally-optimal LP solution 724 to the master LP supply chain master planning problem using masterless iteration with subgradient descent. Although a particular method 900 is shown and described, embodiments contemplate generating globally-optimal LP solution 724 and solving time-based decomposed subproblems 722 using any one or more optimization or heuristic solvers, other methods of masterless iteration and other subgradient methods, according to particular needs.

Method 900 begins at action 902 where solver 204 accesses time-based decomposed subproblems 722 (Subproblem 1, Subproblem 2, ... Subproblem n). As discussed above, each of time-based decomposed subproblems 722 comprise LP formulations of the LP supply chain master planning problem split at a decomposition boundary 720 and sharing the material or capacity for one or more complicating constraints.

At action 904, solver 204 determines whether the current iteration of masterless iteration with subgradient descent is the first iteration (i.e. iteration number is equal to one). When the current iterations is the first iteration, solver 204 continues to action 906 and initializes the Right Hand Side (RHS) of the at least two time-based decomposed subproblems 722. According to embodiments, the sum of the RHS of the at least two time-based decomposed subproblems 722 equals the RHS of the original multi-period LP supply chain master planning problem.

At action 908, solver 204 solves the at least two time-based decomposed subproblems 722 using LP optimization techniques. Each of the at least two time-based decomposed subproblems 722 comprises its own objectives, constraints, and variables. As stated previously, complicating constraints are common to time-based decomposed subproblems 722. Each of the complicating constraints is split on the RHS of a first subproblem and the RHS of the second subproblem. When solver 204 solves time-based decomposed subproblems 722, a dual value is calculated for each of the constraints in time-based decomposed subproblems 722. Using these calculated duals for the first subproblem and the second subproblem, solver 204 calculates the effective dual at action 910. According to the embodiments, the effective dual is the mathematical difference of the dual values of the complicating constraints of time-based decomposed subproblems 722. By way of example only and not of limitation, when a dual value of a first subproblem equals one hundred and a dual value of a second subproblem equals twenty-five, solver 204 calculates the effective dual as seventy-five.

At action 912, solver 204 checks for one or more stop criteria. According to an embodiment, solver 204 stops after calculating globally-optimal LP solution 724. Additionally, or in the alternative, embodiments contemplate a stopping criterion based on, for example, functional interpretation of supply chain data 210. In addition, solver 204 may calculate toleranaces for infeasibility and/or suboptimality for the solve while solving time-based decomposed subproblems 722. For the tolerance infeasibility, solver 204 may calculate whether an infeasibible value (i.e. a value that is greater than the upper bound or less than the lower bound) is less than a specified threshold percentage value. When the infeasible value is within the specicfied threshold range, solver 204 stops the iteration. The suboptimality calculation compares the objective value of the current iteration with the objective values of the last N iterations. When the objective value does not improve for N number of laster iterations, solver 204 may stop the process. For example, a stopping criterion may comprise detecting an infeasibility in material flow is less than a predetermined percentage or detecting a predetermined limit on the optimality gap during convergence of the solutions.

At action 914, solver 204 updates the learning rate. According to an embodiment, solver 204 updates the learning rate during each iteration by division of the previous learning rate by a factor calculated as the square root of the current iteration number. By way of further explanation, for the first iteration, the learning rate is not updated (i.e. the square root of one is equal to one). For a second iteration, the learning rate may be calculated by dividing the learning rate of the first iteration by the square root of two. Similarly, for the third iteration, the learning rate may be calculated by dividing the learning rate of the second iteration by the square root of three; the fourth iteration's learning rate is the learning rate of the third iteration divided by two (i.e. the square root of four); and so on.

After increasing the iteration counter by one at action 916, method 900 returns to action 904, where solver 204 evaluates the iteration number (which is now, not equal to one), and method 900 continues to action 918, where solver 204 updates the RHS bounds using the current effective dual and learning rate. Solver 204 may iteratively loop through the masterless iteration method for each hierarchical objective level and fixed variables 726 until reaching globally-optimal LP solution 724 or detecting one or more other stopping criteria, as discussed above. Because the time-based decomposition method provides for reaching globally-optimal LP solution 724 to the original multi-period LP supply chain master planning problem more quickly, batch runs (e.g., daily, weekly, and the like) can now be performed more quickly, and changes in customer data may now be addressed sooner (e.g., an intraday rerun of LP optimization method based on changes in data).

Embodiments also contemplate, when the solution to time-based decomposed subproblems 722 are infeasible, adding virtual variables that make time-based decomposed subproblems 722 feasible, and, later, removing them.

Figure 10:
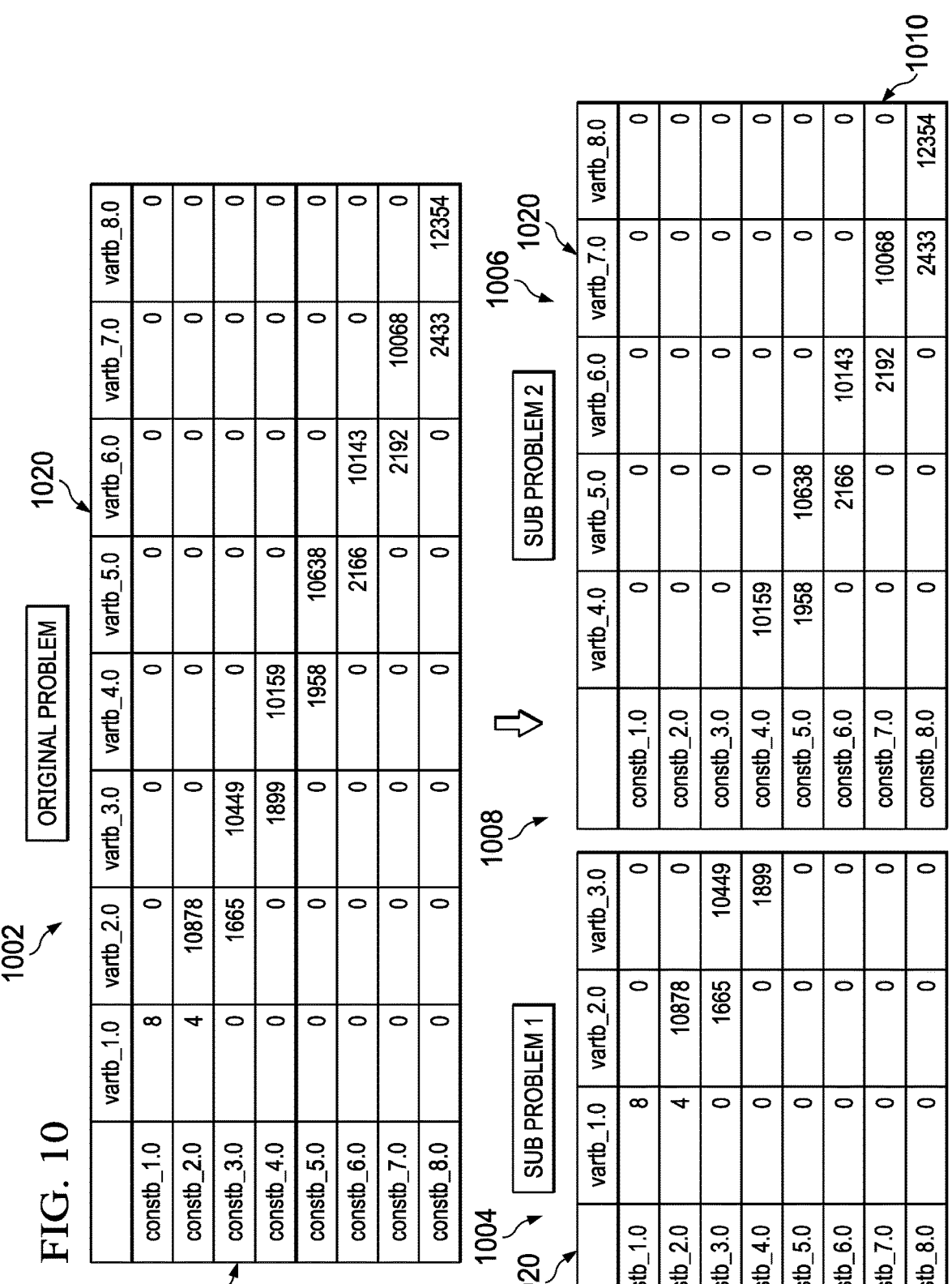
FIG. 10 illustrates an exemplary variable-bucket cross-over matrix and exemplary subproblem variable cross-over matrices, in accordance with an embodiment.

FIG. 10 illustrates exemplary variable-bucket cross-over matrix 1000 and exemplary subproblem variable cross-over matrices 1004-1006, in accordance with an embodiment. Exemplary variable-bucket cross-over matrix 1000 and exemplary subproblem variable cross-over matrices 1004-1006 are organized into rows 1010 corresponding to constraints and columns 1020 corresponding to variables. Each of the rows and columns are associated with a time-bucket. Exemplary variable-bucket cross-over matrix 1000 has eight time buckets (tb_1.0, tb_2.0, . . . tb_7.0, tb_8.0). which are divided between exemplary subproblem variable cross-over matrices 1004-1006 (first exemplary subproblem variable cross-over matrix 1004 has three time buckets; and second exemplary subproblem variable cross-over matrix 1006 has five time buckets. As discussed above, modeler 202 identifies the number of variables starting in each time bucket and the number of variables ending in each time bucket using the sign of the coefficient of the constraints of each variable in each time bucket.

Each intersection (cell) represents a quantity of cross-over variables that either begins in that time bucket or ends in that time bucket. Intersections of rows 1010 and columns 1020 of the same time bucket represent the quantity of cross-over variables that begin in that time bucket, whereas the quantity of cross-over variables that end in a time bucket is given by the intersection of columns 1020 of the time bucket with rows 1010 of the next time bucket. For example, matrix 1000 indicates that eight variables begin in the first time-bucket (i.e. the intersection constb_1.0 and vartb_1.0). By way of a second example, matrix 1000 indicates that four variables end in the first time bucket (i.e. the intersection of constb_2.0 and vartb_1.0.).

Matrix 1000 indicates that the time bucket boundary having the least quantity of cross-over variables which does not create unbalanced subproblems is time bucket boundary 1008 between the third time bucket and the fourth time bucket. Matrix 100 indicates that time bucket boundary 1008 has 1899 cross-over variables. As stated above, time-based decomposition method 600 decomposes the large supply chain into smaller chains, which comprise only a few time buckets and are connected through complicating constraints. Each of these subproblems may be solved iteratively in parallel using the masterless iteration method described above.

By way of explanation only and not of limitation, time-based decomposition of a master LP supply chain master planning problem of exemplary variable bucket cross-over matrix 1000 does not select the time-bucket boundary with the least number of cross-over variables because it would lead to unbalanced subproblems. Instead, time-based decomposition divides the LP supply chain master planning problem into two subproblems, as illustrated by first exemplary subproblem cross-over variable matrix 1004 and second exemplary subproblem cross-over variable matrix 1006. According the illustrated embodiment, the original LP supply chain master planning problem comprises eight time buckets, which is divided into two time-based decomposed subproblems 722: one having three time buckets and one having five time buckets. According to embodiments, the original multi-period master supply chain planning problems is not split after the first time bucket or after the second time bucket (both of which have a lower number of cross-over variables than the time bucket boundary following the third time bucket) because the resulting time-based decomposed subproblems 722 would be unbalanced. Splitting the original multi-period master supply chain planning problem into two subproblems after the first time bucket would result in time-based decomposed subproblems 722 having one time bucket and seven time buckets, or splitting after the second time bucket results in time-based decomposed subproblems 722 having two time buckets and five time buckets. Instead, modeler 202 decomposes the original multi-period master supply chain planning problem into at least two time-based decomposed subproblems by identifying a split between time periods having a number of cross-overs that is the minimum or near the minimum and which also generates subproblems having balanced size and complexity. When splitting the original multi-bucket supply chain planning problem at a time bucket boundary dividing the planning horizon into equal halves, the resulting subproblems may have equal size and complexity. The optimal split divides the planning horizon into equal divisions resulting in subproblems with the same number of constraints. However, in many cases splitting the multi-period supply chain planning problem into two equal time horizons does not guarantee that the resulting subproblems will have equal size and complexity. In one embodiment, the modeler determines that the resulting subproblems are balanced when the difference in the size and complexity of the subproblems is minimized. When the equal division of the multi-bucket supply chain planning problem is not possible, the time bucket boundary may be chosen that divides at the time bucket boundary that provides the subproblems having similar sizes. For example, if a first time bucket split generates subproblems divided into 55% and 45% and a second time bucket split would generate subproblems divided at 65% and 35%, the first time bucket split will be chosen. Embodiments also contemplate estimating the size of the subproblems generated by splitting the planning horizon at each of the time bucket boundaries and choosing the time bucket boundary that results in subproblems having the most similar sizes.

Figure 11:
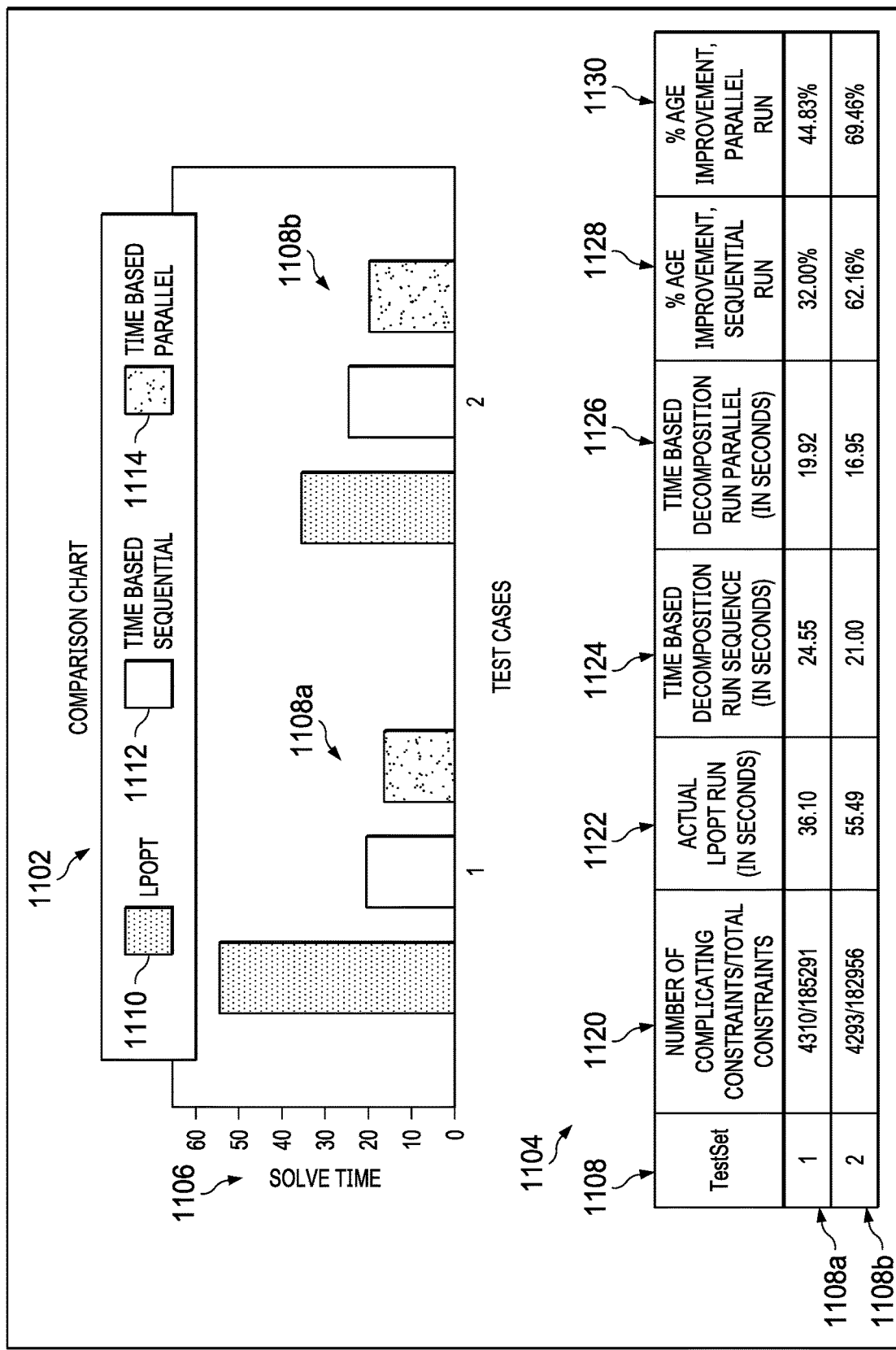
FIG. 11 illustrates a chart and a table summarizing the results for two test cases comparing an linear programming (LP) optimization method with the time-based decomposition method of FIG. 6, in accordance with an embodiment.

FIG. 11 illustrates chart 1102 and table 1104 summarizing the results for two test cases comparing LP optimization method with time-based decomposition method 600 of FIG. 6, in accordance with an embodiment. Chart 1102 summarizes the run time 1106 for obtaining a global solution to master supply chain planning problems for two test cases 1108a-1108b using three solving methods: (1) an LP optimization method (LPOPT) 1110; (2) time-based decomposition method 600 solving the subproblems sequentially (Time-Based Sequential) 1112; and (3) time-based decomposition method 600 solving the subproblems in parallel (Time-Based Parallel) 1114. Table 1104 indicates, for two test cases 1108a-1108b, the number of complicating constraints and total constraints 1120, run time 1122 of LPOPT 1110, run time 1124 of Time-Based Sequential 1112, run time 1126 of Time-Based Parallel 1114, percentage improvement 1128 of run time 1124 of Time-Based Sequential 1112 over run time 1122 of LPOPT 1110, and percentage improvement 1130 of run time 1126 of Time-Based Parallel 1114 over run time 1122 of LPOPT 1110. Results for both test cases 1108a-1108b indicate Time-Based Sequential 1112 run time 1124 (24.55 s.; 21.00 s.) and Time-Based Parallel 1114 run time 1126 (19.92 s.; 19.95 s.) are significantly faster than LPOPT 1110 run time 1122 (36.10 s.; 55.49 s.), and Time-Based Parallel 1114 was the fastest overall for both test cases 1108a-1108b, which validates the performance benefit of time-based decomposition method 600 over LPOPT 1110, providing percentage improvements 1128-1130 between 32.0-69.46%.

FIGS. 12A-12B illustrate charts 1202-1204 comparing the objective value and solve time of an LP optimization method with time-based decomposition method 600 of FIG. 6 using a parallel solve for a first test case, in accordance with an embodiment. Chart 1202 illustrates objective value 1210 of Time-Based Parallel 1114 converges to optimal objective value 1212 in a fraction of the runtime needed for LPOPT (represented by percentage runtime 1214 (Time-Based Parallel 1114/LPOPT 1110)). Chart 1204 illustrates percentage error 1220 compared with percentage runtime 1214 (Time-Based Parallel 1114/LPOPT 1110). As indicated in chart 1204, Time-Based Parallel 1114 reaches an objective value that is less than one-tenth of a percent (0.065%) from optimality by the fourteenth objective level and in 55% of the time needed for LPOPT 1110.

Figure 13A:
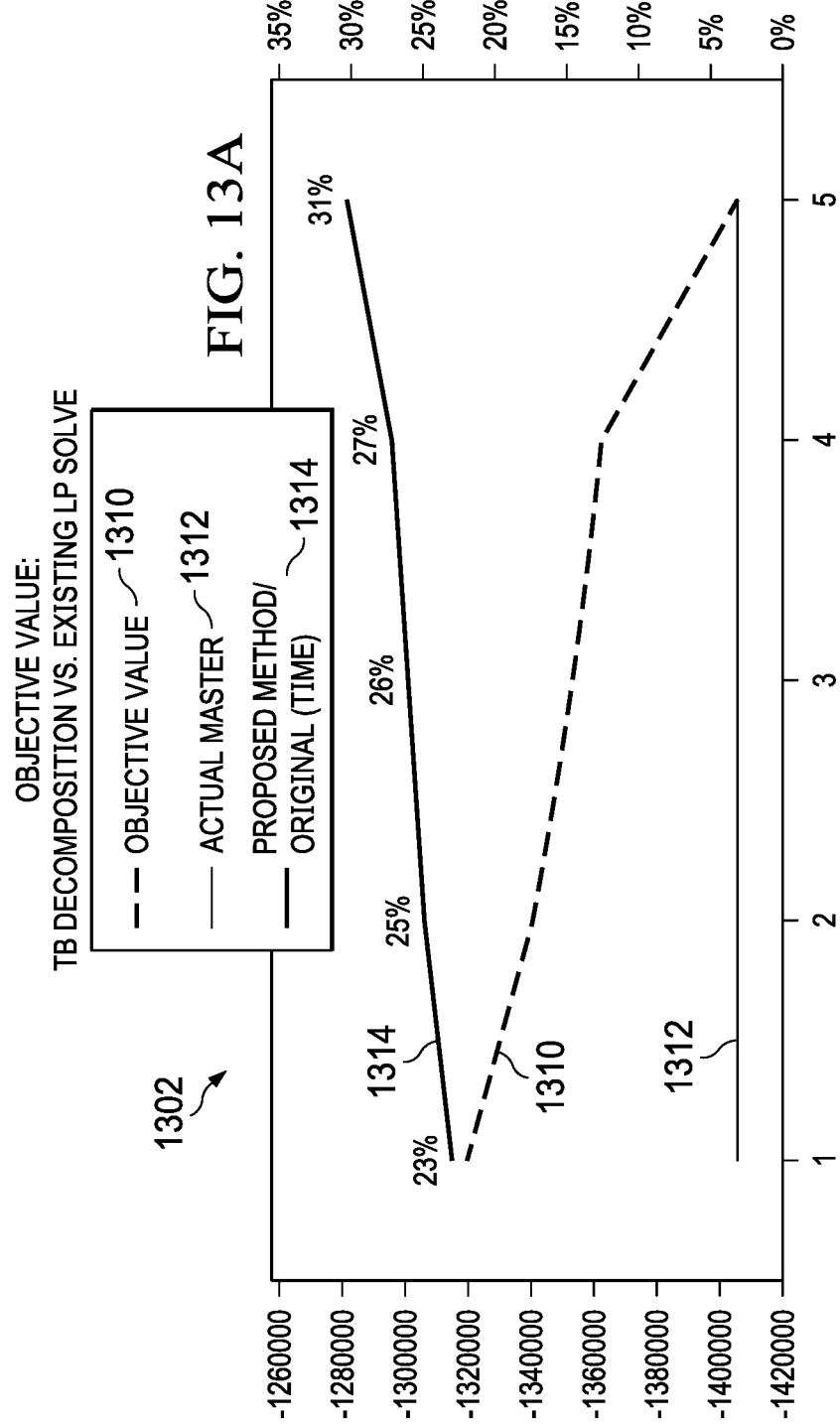
FIGS. 13A-13B illustrate charts comparing the objective value and solve time of an LP optimization method with the time-based decomposition method of FIG. 6 using a parallel solve for a second test case, in accordance with an embodiment.
Figure 13B:
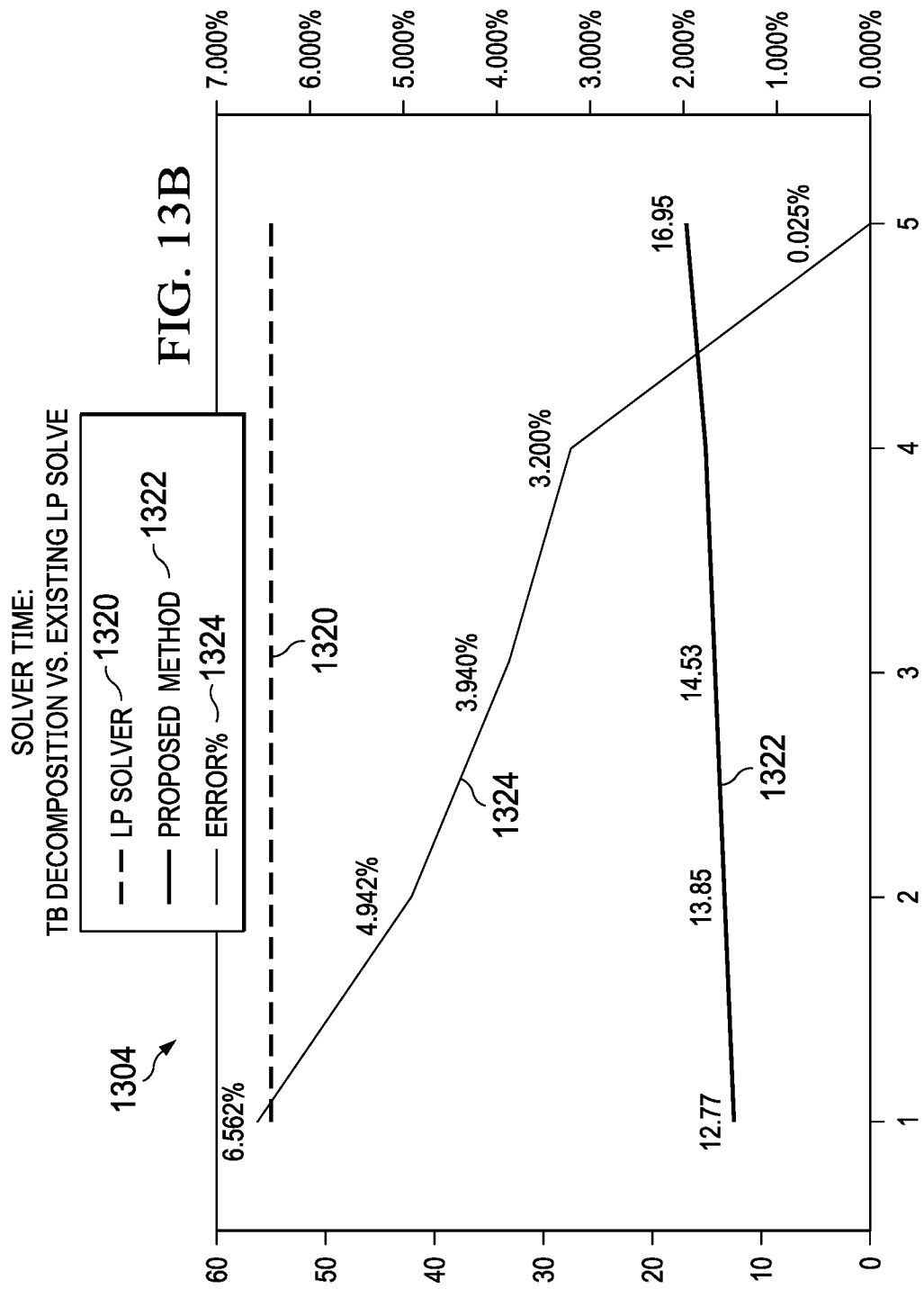

FIGS. 13A-13B illustrate charts 1302-1304 comparing the objective value and solve time of an LP optimization method with time-based decomposition method 600 of FIG. 6 using a parallel solve for a second test case, in accordance with an embodiment. Chart 1302 illustrates objective value 1310 of Time-Based Parallel 1114 converges to optimal objective value 1312 in a fraction of the runtime needed for LPOPT (represented by percentage 1314 of runtime (Time-Based Parallel 1114/LPOPT 1110)). As indicated in chart 1302, Time-Based Parallel 1114 objective value 1310 closely converges to optimal objective value 1312 by the fifth objective level and in 31% of the time needed for LPOPT 1110. Chart 1204 illustrates run time 1320 of LPOPT 1110, run time 1322 of Time-Based Parallel 1114, percentage error 1324 (Time-Based Parallel 1114/LPOPT 1110) As indicated in chart 1304, Time-Based Parallel 1114 reaches an objective value that is less than one-tenth of a percent (0.025%) from optimality by the fifth objective level and in 31% of the time needed for LPOPT 1110.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for iteratively solving a supply chain planning problem modeled as a linear programming (LP) problem, comprising:
a computer, comprising a processor and memory, the computer configured to:
receive a multi-period matrix formulation of at least a portion of an LP supply chain master planning problem;
map constraints of an LP supply chain master planning problem and variables of the LP supply chain master planning problem to a planning horizon;
formulate at least two time-based decomposed subproblems by decomposing the LP supply chain master planning problem at one or more decomposition boundaries;
identify complicating constraints;
perform masterless iteration with subgradient descent; and
repeat the formulate, identify and perform to incrementally improve an overall solution until a stopping criteria is met.

2. The system of claim 1, wherein the computer is further configured to:
calculate the stopping criteria based on a tolerance for infeasibility or suboptimality.

3. The system of claim 1, wherein the computer is further configured to:
update a learning rate after each iteration of the formulate, identify and perform, wherein the learning rate is updated by dividing a previous learning rate by a factor.

4. The system of claim 1, wherein the computer is further configured to:
in response to a solution to a time-based decomposed subproblem being infeasible, adding one or more virtual variables that make the solution to the time-based decomposed subproblem feasible.

5. The system of claim 4, wherein the computer is further configured to:

split the planning horizon at each of one or more time bucket boundaries; and choose a time bucket boundary that results in the at least two time-based decomposed subproblems having the most similar sizes.

6. The system of claim 1, wherein the computer is further configured to:

solve the at least two time-based decomposed subproblems in parallel.

7. The system of claim 1, wherein the computer is further configured to:

during solving the at least two time-based decomposed subproblems, set decision variables at upper or lower bounds to retain an objective value of one or more higher objectives.

8. A computer-implemented method for iteratively solving a supply chain planning problem modeled as a linear programming (LP) problem, comprising:

receiving a multi-period matrix formulation of at least a portion of an LP supply chain master planning problem;

mapping constraints of an LP supply chain master planning problem and variables of the LP supply chain master planning problem to a planning horizon;

formulating at least two time-based decomposed subproblems by decomposing the LP supply chain master planning problem at one or more decomposition boundaries;

identifying complicating constraints;

performing masterless iteration with subgradient descent; and repeating the formulating, identifying and performing steps to incrementally improve an overall solution until a stopping criteria is met.

9. The method of claim 8, further comprising:

calculating the stopping criteria based on a tolerance for infeasibility or suboptimality.

10. The method of claim 8, further comprising:

updating a learning rate after each iteration of the formulate, identify and perform, wherein the learning rate is updated by dividing a previous learning rate by a factor.

11. The method of claim 10, further comprising:

in response to a solution to a time-based decomposed subproblem being infeasible, adding one or more virtual variables that make the solution to the time-based decomposed subproblem feasible.

12. The method of claim 11, further comprising:

splitting the planning horizon at each of one or more time bucket boundaries; and choosing a time bucket boundary that results in the at least two time-based decomposed subproblems having the most similar sizes.

13. The method of claim 8, further comprising:

solving the at least two time-based decomposed subproblems in parallel.

14. The method of claim 13, further comprising:

during solving the at least two time-based decomposed subproblems, setting decision variables at upper or lower bounds to retain an objective value of one or more higher objectives.

15. A non-transitory computer-readable medium embodied with software that iteratively solves a supply chain planning problem modeled as a linear programming (LP) problem, the software when executed:

receives a multi-period matrix formulation of at least a portion of an LP supply chain master planning problem;

maps constraints of an LP supply chain master planning problem and variables of the LP supply chain master planning problem to a planning horizon;

formulates at least two time-based decomposed subproblems by decomposing the LP supply chain master planning problem at one or more decomposition boundaries;

identifies complicating constraints;

performs masterless iteration with subgradient descent; and repeats the formulates, identifies and performs steps to incrementally improve an overall solution until a stopping criteria is met.

16. The non-transitory computer-readable medium of claim 15, wherein the software when executed further:

calculates the stopping criteria based on a tolerance for infeasibility or suboptimality.

17. The non-transitory computer-readable medium of claim 15, wherein the software when executed further:

updates a learning rate after each iteration of the formulate, identify and perform, wherein the learning rate is updated by dividing a previous learning rate by a factor.

18. The non-transitory computer-readable medium of claim 17, wherein the software when executed further:

in response to a solution to a time-based decomposed subproblem being infeasible, adds one or more virtual variables that make the solution to the time-based decomposed subproblem feasible.

19. The non-transitory computer-readable medium of claim 18, wherein the software when executed further:

splits the planning horizon at each of one or more time bucket boundaries; and chooses a time bucket boundary that results in the at least two time-based decomposed subproblems having the most similar sizes.

20. The non-transitory computer-readable medium of claim 15, wherein the software when executed further:

solves the at least two time-based decomposed subproblems in parallel.

* * * * *